(12) United States Patent
Agaian et al.

(10) Patent No.: US 10,230,739 B2
(45) Date of Patent: Mar. 12, 2019

(54) SYSTEM AND DEVICE FOR PREVENTING ATTACKS IN REAL-TIME NETWORKED ENVIRONMENTS

(71) Applicants: Sos S. Agaian, New York, NY (US); James Christopher Collins, Mico, TX (US)

(72) Inventors: Sos S. Agaian, New York, NY (US); James Christopher Collins, Mico, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 148 days.

(21) Appl. No.: 15/190,506

(22) Filed: Jun. 23, 2016

(65) Prior Publication Data
US 2016/0381054 A1    Dec. 29, 2016

Related U.S. Application Data

(60) Provisional application No. 62/185,087, filed on Jun. 26, 2015.

(51) Int. Cl.
*H04L 29/00* (2006.01)
*H04L 29/06* (2006.01)

(52) U.S. Cl.
CPC ............... *H04L 63/1408* (2013.01)

(58) Field of Classification Search
CPC ..... H04L 45/00; H04L 45/02; H04L 67/1002; H04L 29/06; H04L 45/745
See application file for complete search history.

(56) References Cited

U.S. PATENT DOCUMENTS

2011/0141964 A1* 6/2011 Ai .................. H04L 41/044
                                                   370/312

OTHER PUBLICATIONS

"Email-Statistics-Report-2015-2019-Executive-Summary" [Online] Available http://www.radicati.com/wp/wp-content/uploads/2015/02/Email-Statistics-Report-2015-2019- Executive-Summary.pdf.

(Continued)

*Primary Examiner* — Ghazal B Shehni
(74) *Attorney, Agent, or Firm* — Thomas Horstemeyer, LLP

(57) ABSTRACT

Disclosed are various embodiments of a system or method for the transparent handling of real-time streaming application-level data. The disclosed embodiments permit the identification and modification of specified file patterns from within the live stateful data transactions across computer networks. The system includes a unidirectional in-line communications data stream handler, stream pattern detector, stream file modification processor, and memory management subsystem. Embodiments of the disclosure may include devices permitting incoming network data streams to be captured, processed, and selectively modified when implemented on a digital streaming network communications line. One embodiment of the system includes techniques for mitigation of malicious software directed against software based network connected systems. Other embodiments may make use of approaches for digital data hiding and covert channel obfuscation operations on digital multimedia files being transferred through the system. In a non-limiting example, session-unique digital tags may be embedded within real-time data flows of multimedia files, the product of which may be used to enforce privacy policies, intellectual property management, copyright protection, as well as digital content delivery management.

20 Claims, 35 Drawing Sheets

(56) References Cited

OTHER PUBLICATIONS

Landau Susan "Making sense from Snowden: What's significant in the NSA surveillance revelations." IEEE Security & Privacy 4 (2013): 54-63.
Greenwald Glenn "XKeyscore: NSA tool collects' nearly everything a user does on the internet" The Guardian 31 (2013).
Perlroth Nicole et al. "NSA able to foil basic safeguards of privacy on web." The New York Times 5 (2013).
Hughes Lawrence Internet E-mail: protocols, standards, and implementation. Artech House, Inc., 1998.
Rhoton John Programmer's guide to internet mail: SMTP, POP, IMAP, and LDAP. Digital Press, 2000.
Schneier Bruce "Email Security." (2012).
Cocca Pam "Email Security Threats." SANS Institute (2005).
Bleichenbacher Daniel "Chosen ciphertext attacks against protocols based on the RSA encryption standard PKCS# 1." Advances in Cryptology—CRYPTO'98. Springer Berlin Heidelberg, 1998.
Bleichenbacher Daniel et al. "New attacks on RSA with small secret CRT-exponents." Public Key Cryptography-PKC 2006. Springer Berlin Heidelberg, 2006. 1-13.
"Feld Thoughts Quote" [Online] Available http://www.feld.com/archives/2015/06/isnt-pgp-built-gmail.html.
Yamamoto K "An integration of PGP and MIME," Network and Distributed System Security, 1996., Proceedings of the Symposium on, San Diego, CA, 1996, pp. 17-24. doi: 10.1109/NDSS.1996.492351.
Sheng Steve et al. "Why johnny still can't encrypt: evaluating the usability of email encryption software." Symposium on Usable Privacy and Security. 2006.
Borisov Nikita et al. "Off-the-record communication, or, why not to use PGP." Proceedings of the 2004 ACM workshop on Privacy in the electronic society. ACM, 2004.
Feige Uriel et al. "Zero-knowledge proofs of identity." Journal of cryptology 1.2 (1988):77-94.
Rackoff Charles et al. "Non-interactive zero-knowledge proof of knowledge and chosen ciphertext attack." Advances in Cryptology—CRYPTO'91. Springer Berlin Heidelberg, 1991.

\* cited by examiner

| Vector ID | ACK Number | SEQ Number | Protocol ID | Object ID | Data Start Pointer | Current Data Pointer | Bypass Mode |
|---|---|---|---|---|---|---|---|
| 1 | ach49Bc4 | 5466ef | 80 | 53 | 5466ef | 5466ef | 0 |
| 2 | cdef2345 | FCD96F03 | 80 | 32 | fc d9 6c 93 | FCD98363 | 1 |
| 3 | 78ef43ac | 9896adef | 20 | 32 | 9896510 | 9896CA73 | |
| ...... | | | ...... | | | ...... | |
| N | aded329a | 4589D84E | 80 | 27 | 4567DCBA | 4589D29A | 1 |

500

501 → Vector ID
502 → ACK Number
503 → SEQ Number
504 → Protocol ID
505 → Object ID
506 → Data Start Pointer
507 → Current Data Pointer
508 → Bypass Mode

FIG. 5

| Time | Source | Destination | Protocol | Length | Packet Info |
|---|---|---|---|---|---|
| 6.465340000 | 192.168.1.101 | 184.168.52.1 | TCP | 66 | 59415 > http [SYN] Seq=0 Win=65535 Len=0 MSS=1460 WS=256 SACK_PERM=1 |
| 6.522708000 | 184.168.52.1 | 192.168.1.101 | TCP | 66 | http > 59414 [SYN, ACK] Seq=0 Ack=1 Win=0 MSS=1460 Len=0 MSS=1460 SACK_PERM=1 WS=512 |
| 6.522905000 | 192.168.1.101 | 184.168.52.1 | TCP | 54 | 59414 > http [ACK] Seq=1 Ack=1 Win=1024 Len=0 |
| 6.523215000 | 192.168.1.101 | 184.168.52.1 | HTTP | 336 | GET /images/barbara.bmp HTTP/1.1 | ← 1210
| 6.560757000 | 184.168.52.1 | 192.168.1.101 | TCP | 66 | http > 59415 [SYN, ACK] Seq=0 Ack=1 Win=14600 Len=0 MSS=1460 SACK_PERM=1 WS=512 |
| 6.560962000 | 192.168.1.101 | 184.168.52.1 | TCP | 54 | 59415 > http [ACK] Seq=1 Ack=1 Win=262144 Len=0 |
| 6.582799000 | 184.168.52.1 | 192.168.1.101 | TCP | 60 | http > 59414 [ACK] Seq=1 Ack=283 Win=15872 Len=0 | ← 1220
| 6.614404000 | 184.168.52.1 | 192.168.1.101 | TCP | 1514 | [TCP segment of a reassembled PDU] |
| 6.614718000 | 184.168.52.1 | 192.168.1.101 | TCP | 1514 | [TCP segment of a reassembled PDU] |
| 6.614815000 | 192.168.1.101 | 184.168.52.1 | TCP | 54 | 59414 > http [ACK] Seq=283 Ack=2921 Win=1024 Len=0 |
| 6.614076000 | 184.168.52.1 | 192.168.1.101 | TCP | 1514 | [TCP segment of a reassembled PDU] |
| 6.614509000 | 184.168.52.1 | 192.168.1.101 | TCP | 1514 | [TCP segment of a reassembled PDU] |
| 6.615669000 | 192.168.1.101 | 184.168.52.1 | TCP | 54 | 59414 > http [ACK] Seq=283 Ack=5841 Win=1024 Len=0 |
| 6.623521000 | 184.168.52.1 | 192.168.1.101 | TCP | 1514 | [TCP segment of a reassembled PDU] |
| 6.630297000 | 184.168.52.1 | 192.168.1.101 | TCP | 1514 | [TCP segment of a reassembled PDU] |
| 6.630367000 | 192.168.1.101 | 184.168.52.1 | TCP | 54 | 59414 > http [ACK] Seq=283 Ack=8761 Win=1024 Len=0 |
| 6.639629000 | 184.168.52.1 | 192.168.1.101 | TCP | 1514 | [TCP segment of a reassembled PDU] |
| 6.648237000 | 184.168.52.1 | 192.168.1.101 | TCP | 1514 | [TCP segment of a reassembled PDU] |
| 6.648336000 | 192.168.1.101 | 184.168.52.1 | TCP | 54 | 59414 > http [ACK] Seq=283 Ack=11661 Win=1024 Len=0 |
| 6.656203000 | 184.168.52.1 | 192.168.1.101 | TCP | 1514 | [TCP segment of a reassembled PDU] |
| ... | | | | | |
| 11.047604000 | 192.168.1.101 | 184.168.52.1 | TCP | 54 | 59414 > http [ACK] Seq=283 Ack=778181 Win=1024 Len=0 |
| 11.048629000 | 184.168.52.1 | 192.168.1.101 | TCP | 1514 | [TCP segment of a reassembled PDU] |
| 11.056746000 | 184.168.52.1 | 192.168.1.101 | TCP | 1514 | [TCP segment of a reassembled PDU] |
| 11.056645000 | 192.168.1.101 | 184.168.52.1 | TCP | 54 | 59414 > http [ACK] Seq=283 Ack=781101 Win=1024 Len=0 |
| 11.069997000 | 184.168.52.1 | 192.168.1.101 | HTTP | 602 | HTTP/1.1 200 OK (image/bmp) | ← 1230
| 11.100296000 | 192.168.1.101 | 184.168.52.1 | TCP | 54 | 59414 > http [ACK] Seq=283 Ack=781649 Win=1021 Len=0 |

| No. | Time | Source | Destination | Protocol | Length | Info |
|---|---|---|---|---|---|---|
| 1 | 0.000000000 | 192.168.1.107 | 162.159.250.162 | HTTP | 686 | GET /install/bin/WinPcap_4_1_3.exe HTTP/1.1 |
| 2 | 0.047202000 | 162.159.250.162 | 192.168.1.107 | TCP | 60 | http > 52079 [ACK] Seq=1 Ack=633 Win=18 Len=0 |
| 3 | 0.123348000 | 162.159.250.162 | 192.168.1.107 | TCP | 1514 | [TCP segment of a reassembled PDU] ← 1610 |
| 4 | 0.123437000 | 192.168.1.107 | 162.159.250.162 | TCP | 54 | 52079 > http [ACK] Seq=633 Ack=1461 Win=1024 Len=0 |
| 5 | 0.124590000 | 162.159.250.162 | 192.168.1.107 | TCP | 1514 | [TCP Previous segment not captured] [TCP segment of a reassembled PDU] |
| 6 | 0.124658000 | 192.168.1.107 | 162.159.250.162 | TCP | 66 | [TCP Dup ACK 4#1] 52079 > http [ACK] Seq=633 Ack=1461 Win=1024 Len=0 SLE=0 SLE=2921 |
| 7 | 0.124968000 | 162.159.250.162 | 192.168.1.107 | TCP | 1514 | [TCP segment of a reassembled PDU] |
| 8 | 0.125002000 | 192.168.1.107 | 162.159.250.162 | TCP | 66 | [TCP Dup ACK 4#2] 52079 > http [ACK] Seq=633 Ack=1461 Win=1024 Len=0 SLE=0 SLE=2921 |
| 9 | 0.128547000 | 162.159.250.162 | 192.168.1.107 | TCP | 1514 | [TCP segment of a reassembled PDU] |
| 10 | 0.128622000 | 192.168.1.107 | 162.159.250.162 | TCP | 66 | [TCP Dup ACK 4#3] 52079 > http [ACK] Seq=633 Ack=1461 Win=1024 Len=0 SLE=0 SLE=2921 |
| 11 | 0.128892000 | 162.159.250.162 | 192.168.1.107 | TCP | 904 | [TCP segment of a reassembled PDU] |
| 12 | 0.128926000 | 192.168.1.107 | 162.159.250.162 | TCP | 66 | [TCP Dup ACK 4#4] 52079 > http [ACK] Seq=633 Ack=1461 Win=1024 Len=0 SLE=0 SLE=2921 |
| 13 | 0.141729000 | 162.159.250.162 | 192.168.1.107 | TCP | 672 | [TCP segment of a reassembled PDU] |
| 14 | 0.141840000 | 192.168.1.107 | 162.159.250.162 | TCP | 66 | [TCP Dup ACK 4#5] 52079 > http [ACK] Seq=633 Ack=1461 Win=1024 Len=0 SLE=0 SLE=2921 |
| 15 | 0.143962000 | 162.159.250.162 | 192.168.1.107 | TCP | 1514 | [TCP segment of a reassembled PDU] |
| 16 | 0.144051000 | 192.168.1.107 | 162.159.250.162 | TCP | 66 | [TCP Dup ACK 4#6] 52079 > http [ACK] Seq=633 Ack=1461 Win=1024 Len=0 SLE=0 SLE=2921 |
| ... | ... | ... | ... | ... | ... | ... |
| 1360 | 5.423421000 | 192.168.1.107 | 162.159.250.162 | TCP | 54 | 52079 > http [ACK] Seq=633 Ack=909589 Win=1024 Len=0 |
| 1361 | 5.437293000 | 162.159.250.162 | 192.168.1.107 | TCP | 1514 | [TCP segment of a reassembled PDU] |
| 1362 | 5.437389000 | 192.168.1.107 | 162.159.250.162 | TCP | 54 | 52079 > http [ACK] Seq=633 Ack=911049 Win=1024 Len=0 |
| 1363 | 5.437702000 | 162.159.250.162 | 192.168.1.107 | TCP | 1514 | [TCP Previous segment not captured] [TCP segment of a reassembled PDU] |
| 1364 | 5.437743000 | 192.168.1.107 | 162.159.250.162 | TCP | 66 | [TCP Dup ACK 1362#1] 52079 > http [ACK] Seq=633 Ack=911049 Win=1024 Len=0 |
| 1365 | 5.438030000 | 162.159.250.162 | 192.168.1.107 | TCP | 1514 | [TCP Out-Of-Order] [TCP segment of a reassembled PDU] |
| 1366 | 5.438080000 | 192.168.1.107 | 162.159.250.162 | TCP | 54 | 52079 > http [ACK] Seq=633 Ack=913969 Win=1024 Len=0 |
| 1367 | 5.443081000 | 162.159.250.162 | 192.168.1.107 | TCP | 1514 | [TCP segment of a reassembled PDU] |
| 1368 | 5.443084000 | 162.159.250.162 | 192.168.1.107 | HTTP | 90 | HTTP/1.1 200 OK (application/x-msdos-program) ← 1620 |

| No. | Time | Source | Destination | Protocol | Length | Info |
|---|---|---|---|---|---|---|
| 90 | 7.968764000 | 64.233.160.108 | 192.168.1.100 | TCP | 66 | 587ai'61465 [SYN, ACK] Seq=0 Ack=1 Win=42900 Len=0 |
| 91 | 7.968868000 | 192.168.1.100 | 64.233.160.108 | TCP | 54 | 61465ai'587 [ACK] Seq=1 Ack=1 Win=65536 Len=0 |
| 92 | 7.993933000 | 64.233.160.108 | 192.168.1.100 | SMTP | 103 | S: 220 mx.google.com ESMTP u5sm87292309m.1 - gsmtp |
| 93 | 7.997285000 | 192.168.1.100 | 64.233.160.108 | SMTP | 68 | C: EHLO scholar |
| 94 | 8.021209000 | 64.233.160.108 | 192.168.1.100 | TCP | 60 | 587ai'61465 [ACK] Seq=50 Ack=15 Win=43008 Len=0 |
| 95 | 8.026679000 | 64.233.160.108 | 192.168.1.100 | SMTP | 221 | S: 250 mx.google.com at your service, |
| | | | | | | [71.42.153.30] 250 SIZE 35882577 25 6HITMIME 250 STARTTLS 250 ENHANCEDSTATUSCODES 250 PIPELINING 250 CHUNKING 250 SMTPUTF8 |
| 96 | 8.027715000 | 192.168.1.100 | 64.233.160.108 | SMTP | 64 | C: STARTTLS |
| 97 | 8.062068000 | 64.233.160.108 | 192.168.1.100 | SMTP | 84 | S: 220 2.0.0 Ready to start TLS |
| 98 | 8.062454000 | 192.168.1.100 | 64.233.160.108 | TLSv1.2 | 228 | Client Hello |
| 99 | 8.098182000 | 64.233.160.108 | 192.168.1.100 | TLSv1.2 | 1484 | Server Hello |
| 100 | 8.098512000 | 64.233.160.108 | 192.168.1.100 | TCP | 1484 | [TCP segment of a reassembled PDU] |
| 101 | 8.098563000 | 192.168.1.100 | 64.233.160.108 | TCP | 54 | 61465ai'587 [ACK] Seq=199 Ack=3107 Win=65536 Len=0 |
| 102 | 8.098860000 | 64.233.160.108 | 192.168.1.100 | TLSv1.2 | 707 | Certificate |
| 103 | 8.105577000 | 192.168.1.100 | 64.233.160.108 | TLSv1.2 | 204 | Client Key Exchange, Change Cipher Spec, Encrypted |
| 104 | 8.140068000 | 64.233.160.108 | 192.168.1.100 | TLSv1.2 | 324 | New Session Ticket, Change Cipher Spec, Encrypted |
| 105 | 8.152958000 | 192.168.1.100 | 64.233.160.108 | TLSv1.2 | 123 | Application Data |
| 106 | 8.179826000 | 64.233.160.108 | 192.168.1.100 | TLSv1.2 | 331 | Application Data |
| 107 | 8.180559000 | 192.168.1.100 | 64.233.160.108 | TLSv1.2 | 123 | Application Data |
| 108 | 8.202260000 | 64.233.160.108 | 192.168.1.100 | TLSv1.2 | 123 | Application Data |
| 109 | 8.202524000 | 192.168.1.100 | 64.233.160.108 | TLSv1.2 | 123 | Application Data |
| 110 | 8.227565000 | 64.233.160.108 | 192.168.1.100 | TLSv1.2 | 123 | Application Data |
| 111 | 8.227767000 | 192.168.1.100 | 64.233.160.108 | TLSv1.2 | 123 | Application Data |
| 112 | 8.293320000 | 64.233.160.108 | 192.168.1.100 | TCP | 60 | 587ai'61465 [ACK] Seq=4445 Ack=625 Win=45056 Len=0 |
| 113 | 8.727784000 | 64.233.160.108 | 192.168.1.100 | TLSv1.2 | 123 | Application Data |
| 114 | 8.737586000 | 192.168.1.100 | 64.233.160.108 | TLSv1.2 | 139 | Application Data |
| 115 | 8.771548000 | 64.233.160.108 | 192.168.1.100 | TCP | 60 | 587ai'61465 [ACK] Seq=4514 Ack=710 Win=45056 Len=0 |
| 116 | 8.771710000 | 64.233.160.108 | 192.168.1.100 | TLSv1.2 | 139 | Application Data |
| 117 | 8.772216000 | 192.168.1.100 | 64.233.160.108 | TLSv1.2 | 139 | Application Data |
| 118 | 8.830319000 | 64.233.160.108 | 192.168.1.100 | TLSv1.2 | 139 | Application Data |
| 119 | 8.830673000 | 192.168.1.100 | 64.233.160.108 | TLSv1.2 | 107 | Application Data |
| 120 | 8.906332000 | 64.233.160.108 | 192.168.1.100 | TCP | 60 | 587ai'61465 [ACK] Seq=4684 Ack=843 Win=45056 Len=0 |

SYSTEM AND DEVICE FOR PREVENTING ATTACKS IN REAL-TIME NETWORKED ENVIRONMENTS

CROSS REFERENCE TO RELATED APPLICATIONS

This application claims priority to, and the benefit of, U.S. Provisional Application No. 62/185,087, filed on Jun. 26, 2015, entitled "SYSTEM AND DEVICE FOR PREVENTING ATTACKS IN REAL-TIME NETWORKED ENVIRONMENTS," which is incorporated by reference as if set forth herein in its entirety.

BACKGROUND

The Internet, in its original inception, was designed and envisioned to be used to exchange and expand technical and community knowledge using free and open information transport protocols transmitted over a multitude of expanding communications paths and data channels. The underlying communications system expanded rapidly over the last couple decades, connecting the military, academic, and industrial communities all around the world. Rapid application development spurred on by enhanced commercialization and marketing opportunities have resulted in a highly complex and evolved industrial communications market place that is now a well-established and essential worldwide interconnected community of both commerce and communications.

The resulting capabilities and opportunities for prosperity brought on by this human communications marvel has also resulted in the ever escalating attraction of malfeasant actors, relentlessly intent on exploiting and capitalizing on the fundamental open-style architecture on which the Internet was principally designed upon.

The rapid expansion of the Internet as an indispensable international commerce environment and principle global information repository yielded to inevitable requirement for information assurance in the form of three fundamental data tenets; namely confidentiality, integrity, and availability. These three areas of information assurance continue to be the backdrop for the struggle that goes on between those that work to ensure the open exchange of global information and commerce and those that wage unrelenting efforts, intent to exploit this environment for reasons of mischievousness or ill-gotten profit.

In response to the overarching and pressing requirements for data confidentiality, data integrity, and data availability, an entire industry rapidly evolved with the purpose of ensuring that the global Internet is a secure, trusted, and operationally relevant communications environment that would sustain an ever expanding commercial marketspace. To wit, a broad class of systems, tools, and applications were developed and employed at various points within this internetworked system in an attempt to achieve a high, or at the very least, and accepted level of data confidentiality, integrity, and availability. This group of capabilities can include a non-exhaustive list such as network firewalls and packet filtering systems, network traffic load balancers, access control lists for routers and switches, intrusion detection and prevention systems, proxy servers and network address translation systems, network deep packet scanners, web cache servers, email address filters and content scanners, detection and eradication systems for defenses against virus, spyware, and malware attacks, as well as a variety of hardware and software encryption technologies.

Unfortunately, even given all these technologies that are designed specifically to secure the Internet, and the thousands of sub-networks that connect to it, openly communicating or engaging in business (e.g., verifying credit card transactions, transferring funds, storing and using private personal information, buying and selling products) on this global information interchange remains a risky proposition. Malfeasant actors, intent on exploiting information resources on the Internet, continue to develop and deploy advanced evasion techniques. Advanced evasion techniques (AET) are specially crafted tactics, techniques or procedures implemented in software that are designed specifically to subvert the current network security systems or the protection mechanisms used on network connected computer processing systems (e.g., servers, clients, routers, switches).

BRIEF DESCRIPTION OF THE SEVERAL VIEWS OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 depicts the stream state table structure used internally by the RSU devices.

FIG. 12 is a descriptive text output of the starting and ending phases of an image transfer using the hypertext transfer protocol (HTTP) which identifies the time, source, destination, protocol, segment length, and packet information.

FIG. 14 is a network packet capture illustration showing the essential pattern persistence of key data elements for inbound facing system which captures, analyzes, and operates on data streams for systems shown in FIG. 1 and FIG. 2 or other systems used for the identification of patterns and modification of data in stateful transactions.

FIG. 16 is a descriptive text output of the starting and ending phases of an executable file transfer using the hypertext transfer protocol (HTTP) which identifies the time, source, destination, protocol, segment length, and packet information.

FIG. 18 show the entire data segment of packet number 1 for an active executable file in which an area within the data segment is identified and targeted for active file obfuscation to render null the entire executable file.

FIG. 32 shows the packet capture session during a normal SSL and TLS email transaction for the user to service configuration.

FIG. 33 shows the packet capture session during a normal SMTP email transaction for the client user to email server system.

DETAILED DESCRIPTION OF THE DISCLOSURE

Figure 1:
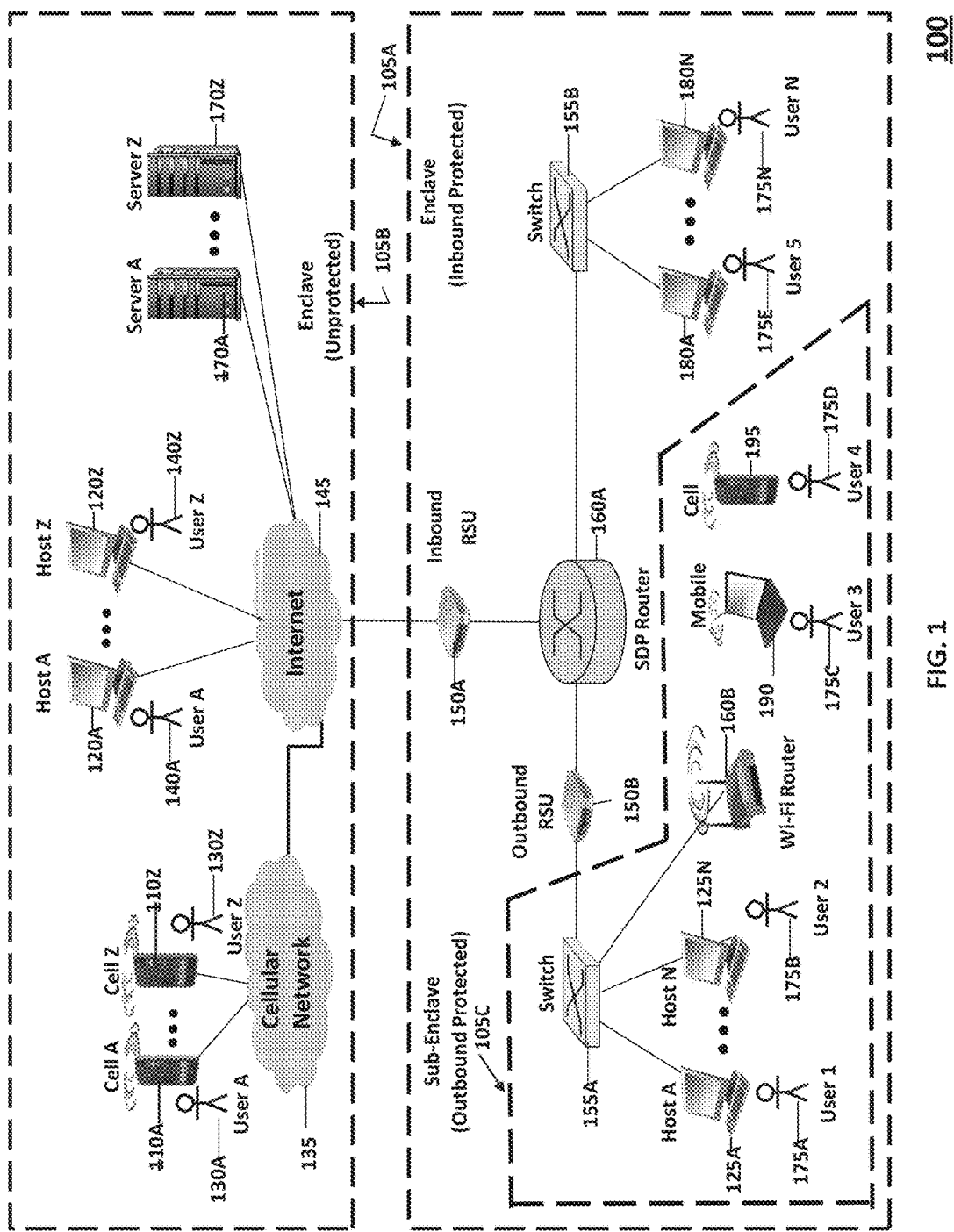
FIG. 1 depicts a high level system engineering diagram of a generalized enterprise network architecture with two separate Realtime Security Unit (RSU) systems forming an unprotected enclave, an inbound protected enclave, and an internal outbound sub-enclave, all which interact with the extended worldwide Internet.

The present disclosure relates to a set of methods and devices commonly referred to as network intrusion detection or prevention systems and deep network packet inspection systems. In particular it relates to methods in which stateful data streams can be intercepted, algorithmically analyzed, selectively modified, and reinserted in the stateful data stream in near real-time during information transfer between one or more processing systems over a computer network. Aspects of this disclosure are also related to the tradecrafts of digital data hiding and covert channel obfuscation, which embodies digital tagging and watermarking. In one exemplary aspect, the disclosure relates to the use of the system as an intermediary device for mitigation of malicious software directed against software based network connected systems.

The present disclosure, therefore, provides for systems and methods for the transparent handling of real-time streaming application-level data. Various embodiments of the disclosed disclosure permit the identification and modification of specified file patterns from within the live stateful data transactions across computer networks. In some instances, the system includes of a unidirectional in-line communications data stream handler, stream pattern detector, stream file modification processor, and memory management subsystem. Embodiments of the disclosure may include devices permitting incoming network data streams to be captured, processed, and selectively modified when implemented on a digital streaming network communications line. One embodiment of the system may include one or more processors and a storage medium that stores computer program instructions that is executable by the one or more processors, said computer program instructions executable by the processor to implement various approaches for mitigation of malicious software directed against software based network connected systems. In another aspect of this disclosure, the approaches to implement digital data hiding and covert channel obfuscation operations on digital multimedia files being transferred through the system are disclosed. In a non-limiting example class, this embodiment provides the functionality to embed session-unique digital tags within real-time data flows of multimedia files, the product of which may be used to enforce privacy policies, intellectual property management, copyright protection, as well as digital content delivery management.

Disclosed herein are systems and methods of use for network intrusion detection or prevention, and deep network packet inspection. The embodiment of this disclosure is represented by an active network security system used to identify patterns within stateful network transactions and functions to modify selected data elements within stateful data flows to effect desired algorithmic results as the messages flow though this system from between other information processing resources. The system resides between the information source system (servers), which provides the application data, and one or more destination systems (clients) which can be a software system, appliance, or another application. The system can be a network security-centric appliance suitable for use in present day computer network environments. It can be a unidirectional connected network appliance capable of communications network data stream interception functions, stream extraction and insertion, message handling functions, message pattern detection algorithms, and event based stream data modification functionality. The system captures, processes, and forwards all network messages that are either transmitted or received through its multiple unidirectional interfaces. The system simultaneously identifies and processes multiple individualized client-to-server and server-to-client message flows and performs low level data analysis on each individual data segment within these discrete application data streams. Using a prescribed set of rules the system algorithmically resolves to a predefined series of potential actions that could be applied toward a particular data segment within the stream which is being transferred though the system.

One embodiment of the system includes the means and methods to implement computer system exploitation mitigation processes against zero-day malicious software directed against software based network connected systems. Because the system can reside between the application processing nodes, as defined by the client-server paradigm, one implementation of an embodiment facilitates digital data hiding and covert channel obfuscation operations on digital multimedia files being transferred through the system. In a direct follow-on relation to this digital embedding capability, the system can include functionality to embed session-unique digital tags within the real-time data flows of multimedia files. The resultant data artifacts from this tagging function may be used to subsequently enforce privacy policies, intellectual property management, copyright protection, as well as digital content delivery management.

FIG. 1 provides an example depiction of a generalized inter-networked system, 100, that includes a protected network enclave, 105. This protected network enclave is established using two separate instances of an embodiment, 150A-B, herein referred to as the Realtime Security Unit (RSU). Not all the components shown in this figure are required and some implementations of a protected network enclave may include additional components in a variety of configurations. Variations in the type and arrangement of the disclosure as associated with network connected components may be made without departing from the scope or intention of the claims set forth herein.

As shown in FIG. 1 an RSU, 150A, is connected between the protected network enclaves' service delivery point (SDP) router and the point of communication delivery from the Internet service provider. This RSU can be inserted between the normal network interface receive data line of the SDP router as an inbound protection device. The transmit data from the SDP to the outbound service provider is uninterrupted and the RSU has no effect on this transmitted data line. In this configuration the inbound RSU, 150A, can capture all messages that are inbound from the unprotected network, 105B, into the protected network enclave, 105A. The disclosed embodiments intercept, handle, inspect, apply selected algorithmic modification processes on the message data, reconstruct the messages, and then forward this inbound message traffic between the two named enclaves, 105A-B. Several exemplary algorithmic processes that may be performed on the message data fields will be defined in the following sections.

Also shown in FIG. 1 is a second, internal RSU, 150B, situated within the inbound protected enclave, 105A, between the SDP and an internal network switch, 155A. This internally situated RSU can be inserted between the normal network interface transmit data line of the network switches link to the SDP router to establish in internal outbound protected network sub-enclave. The transmitted messages originating from this internal switch, 155A, to the outbound service provider router are intercepted by the RSU, 150B, and subsequently handled, inspected, evaluated for selective application of modification algorithms and then the messages are reconstructed and forwarded to the SDP router for further network stream state monitoring and message operations. The network devices that will have their outbound-only message traffic intercepted by the 105B RSU include the network host nodes, 125A-N and the Wi-Fi router, 160B. Since the Wi-Fi router provides network connectivity services to the mobile laptop, 190, and the Wi-Fi connected cell phone, 195, the outbound messages from these devices will also be subjected to any prescribed operational functions of the disclosure, namely the outbound RSU, 150B.

Other network connected devices on this example network, 100, include groupings of host nodes, 180A-N, 125A-N, and 120A-Z, networked servers 170A-Z, mobile cellular devices connected via a cellular data network, 135, and network switches 155A-B. The message traffic that flows between all these, and the previously defined devices within this exemplary network environment can be processed by the present embodiment if the network messages flow across a network path in which the system is employed.

Heretofore, the assumption has been made that all network messages intercepted by an RSU have been unencrypted. While the disclosure is such that it captures and effects messages in a unidirectional data stream, in one embodiment of the system, a pairing of two separate RSU devices is capable of conducting a cooperative exchange of message traffic to implement the classical man-in-the-middle (MITM) cryptographic session key interception and renegotiation exchange functions as defined in the cited literature.

Figure 2:
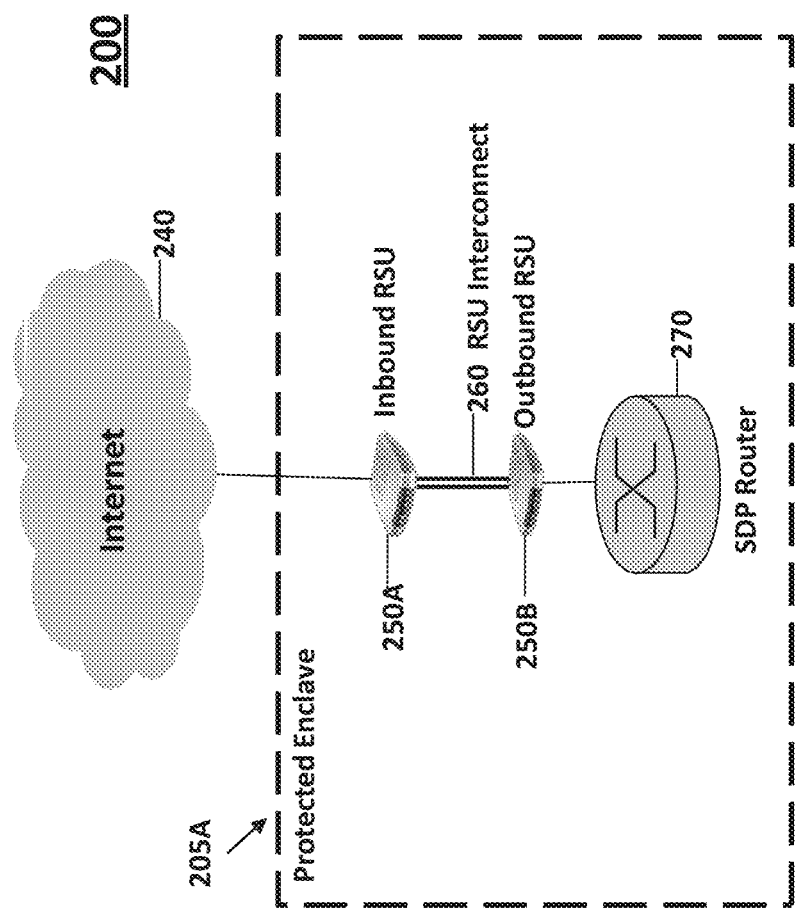
FIG. 2 depicts an inbound and outbound pair of RSU devices interconnected with an RSU interconnect line which are used to establish an enclave that is protected by inbound and outbound traffic interception and protection functions.

FIG. 2 depicts a configuration in which two RSU systems, 250A-B, are placed in serial fashion at the service delivery point to the Internet. RSU 250A intercepts all inbound messages while RSU 250B intercepts all outbound message traffic. Using an interconnecting data communications link, 260, the paired RSU devices are able to exchange collaborated message stream traffic that is in the initial processes of establishing a cryptographic session key exchange. Using well known prescribed MITM functions, the paired RSU devices are able to maintain session level decryption, and thusly unencrypted introspection of message traffic traversing the SDP boundary.

Figure 3:
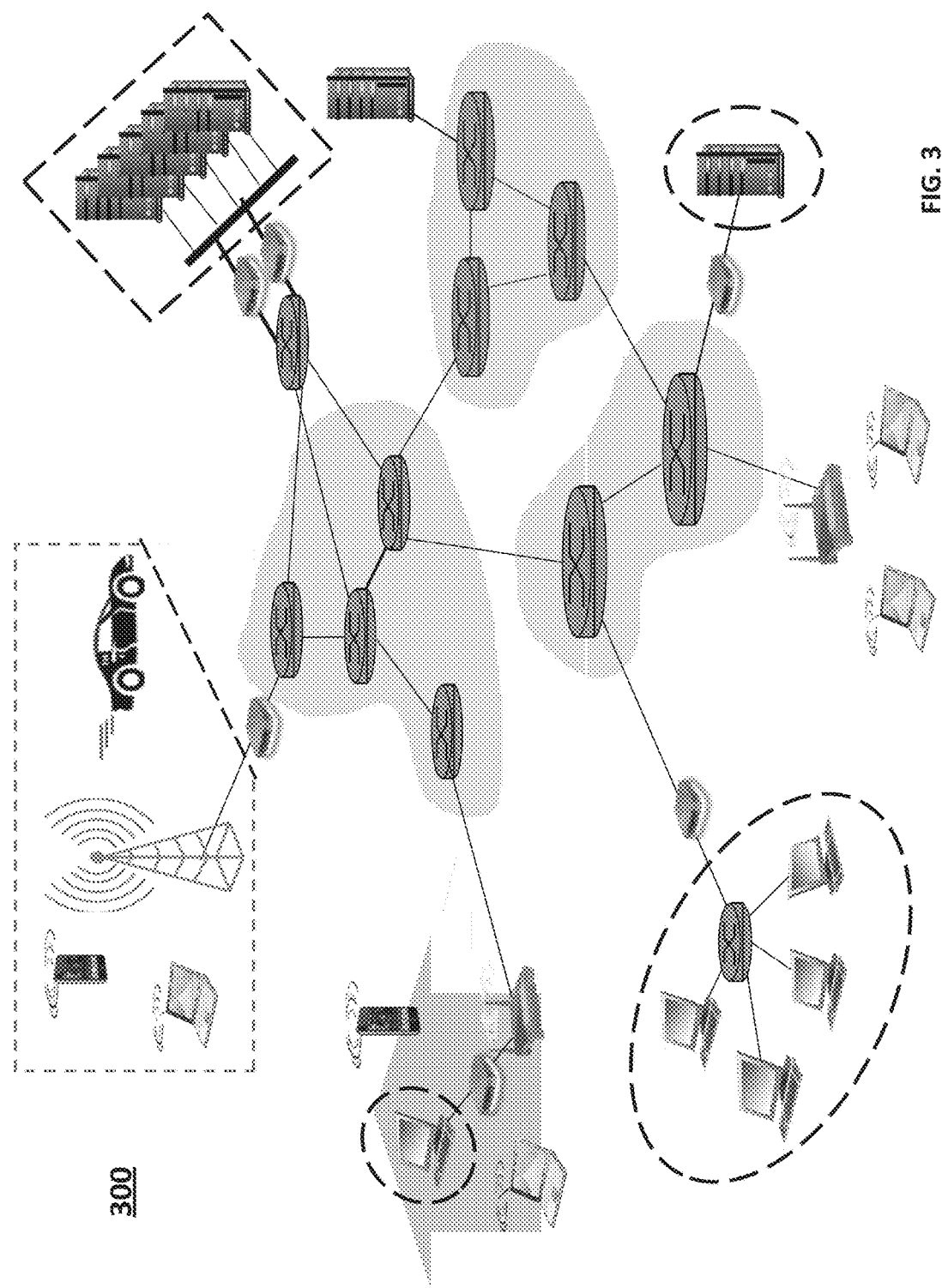
FIG. 3 depicts a high level system engineering diagram of a typical wide area internetwork architecture with four separate RSU system forming four distinct and independent protection enclaves.

FIG. 3 expands upon the network depictions in FIG. 1 by showing 5 RSU devices, 305A-E, in various extended network configurations. RSU 305A is shown as a small office, home office (SOHO) network message protection device which establishes an inbound message protected enclave, 315, for one specified end user node, 310A. While the Wi-Fi router, 360A, does provide Internet service and local device-to-device networking, 310A-C, the device(s) intermediated by the RSU, 305A, will have its message traffic processed and protected by the RSU, thus establishing an example use case for single device protection by an embodiment. As a refinement of this idea, the present example embodiment proposes that protection from both local and remote network threats is achieved in this configuration.

In another embodiment, FIG. 3 shows an enclave of hosts, 330A-D, connected to a router, 340A, which in turn is interfaced to an outbound RSU device, 305B. This configuration is similar to 105C, the protected sub-enclave. The illustrated embodiment intercepts, handles, inspects, applies selected algorithmic modification processes on the message data, reconstructs the messages and then forwards outbound message traffic from 350A to 350B. Message traffic originating from 350B and transferring into this protected enclave to route 350A, is not intercepted or observed by the intermediate RSU, 305B. This configuration embodies the concept and implementation of a protected development environment in which RSU 305B may in one embodiment be used prevent specific executable files, database files or other protected data object from being maliciously or inadvertently exfiltrated from the enclave across the network connection.

A representation of a small to medium size cloud server system is depicted as server frames 380A-N in FIG. 3. In one embodiment of the disclosure, it may be desirable for a service provider to offer a specialized service, such as a network server storage environment, in which they guarantee that no active executable files are stored within the user data storage containers (e.g., disk storage arrays). In this embodiment, all inbound message streams are inspected for the presence of active executable file types by the inbound RSU device, 305D. The illustrated embodiment, configured as an inbound protection unit, can intercept and perform handling functions on all inbound messages followed by a deep packet inspection and observation of the application data structure resulting in reversible algorithmic nullification of any active executable files within the data streams. The nullified executable message traffic is then reconstructed and properly forwarded to be harmlessly stored within the cloud servers, 380A-N. When these same executable data files (nullified) are accessed for retrieval, a reversible algorithm may be applied using an outbound RSU device, situated to intercept and invert specific customer file streams containing pre-nullified executables. Similarly, this embodiment may be used to prevent active executables (e.g., malware) from being uploaded onto information servers, thereby potentially mitigating an active unknown system vulnerability. As a complementary embodiment, a representative small cloud server providing multimedia based content shown as 370 in FIG. 3 may be front-ended with an outbound RSU device, 305C. Outbound data streams are then intercepted and using select modification algorithms, the message data is non-disruptively modified (tagged) with recipient identifying information (e.g., time, date, IP address, user unique ID) prior to the message being reconstructed then forwarded for user delivery. This capability could be used in a plurality of applications to include, but not limited to enhanced customer billing, content delivery verification, or quality of service management.

Other network connected devices on this exemplary network, 300, include a group of interconnect core routers, 350B-K, a core connected server, 375, and a cellular network node front ended with RSU 305E, hosting both fixed and moving message processing systems 390A-C. The message traffic that flows between all these, and the previously defined devices within this exemplary network environment may be processed in a plurality of ways using a variety of application specific message processing algorithms. These systems and devices are included to amplify the point that the example embodiment is not limiting in how it may be integrated into existing data network systems, that may be both fixed and mobile in there design.

Figure 4:
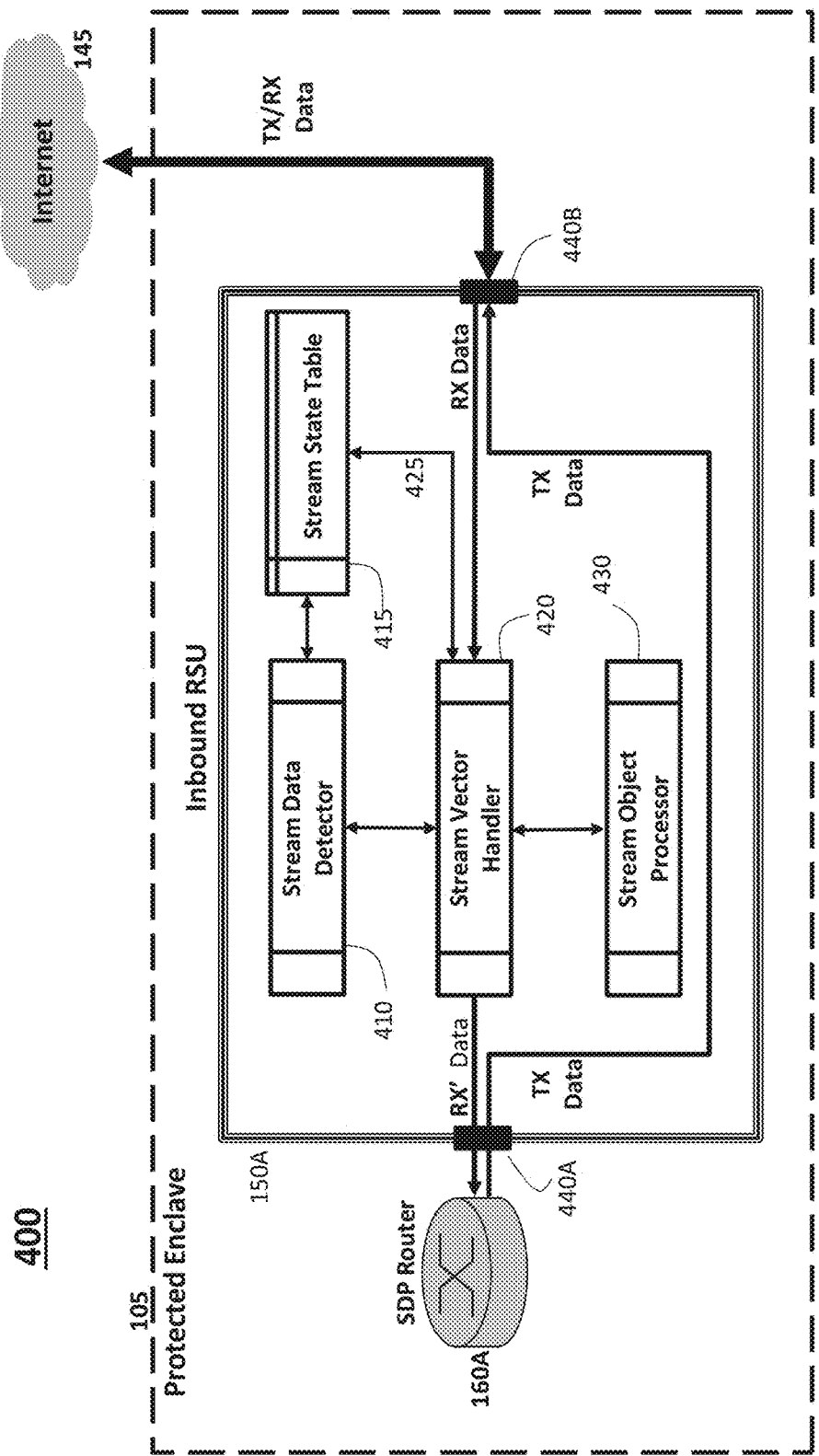
FIG. 4 is a block diagram of the RSU system when implemented as an inbound data facing device, showing the block diagrams for a generalized overview of a system for the identification of patterns and modification of identified datagrams in a stateful network transaction. It is a high level process flow diagram meant to describe the datagram stream flow into, within, and out of the system when configured as an inbound data facing device as described in the embodiment of the present disclosure.

FIG. 4 is a functional block diagram illustrating the generalized operation of an embodiment when implemented as an inbound RSU. FIG. 4 is illustrative of the system depictions found in FIG. 1, FIG. 2, and FIG. 3. These systems can be used to monitor, at real-time network processing speeds, unidirectional network message traffic and upon the presentation of the message signal to the RSU interface, 440B, intercept, handle, inspect, apply any selected algorithmic modifications on message data, reconstruct the messages and then forward the intercepted message to the intended recipient via interface 440A. For the given exemplary system, 150A, shown in FIG. 4, inbound data or receive data, can be considered message traffic inbound to interface 440B originating externally from the protected enclave, 105. Outbound messages, or transmitted data messages are considered as originating externally, arriving to the RSU, 150A, and presented to interface 440A.

From a functionality perspective, messages will arrive on interface 440B, typically presented as Ethernet frame data. The RSU will intercept each network frame, which are equally referred to as messages, and present these messages to the stream handler, 420. The stream vector handler can use process queueing to effectively buffer messages which arrive asynchronously. Once registered by the stream vector handler, 420, the frame structure can be assigned a data structure pointer value which is used to reference the assigned data structure within memory during the lifetime of the frame. The stream state can be uniquely derived from the, non-sequential, unidirectional message flow that is asynchronous presented to the inbound interface, 440B.

The frame pointer value is passed from the stream handler, 420, to the stream data detector function, 410, where the data structure is decomposed to expose the TCP header level. The next step involves the identification of the session stream context vector value, comprised the initial datagram sequence number, acknowledgement number, source data port identifier, and the object identifier. The data structure of the message can even be further decomposed to expose the application data level, specifically level 7 as referenced in the ISO/IEC 7498-1 data interconnect model. This type of operation is generally referred to as deep packet processing (DPP) or deep packet inspection (DPI). Using this DPI function, the object identifier is fully defined by an associated static string file reference lookup that correlates the first 64 bits of the data field with a standard set of reference objects known as the file format magic number. This context vector value is then passed to the stream state table, 415 and recorded as the vector identifier.

FIG. 5 depicts the information structure of the state table, 500. These table records are referenced by the stream data detector, stream vector handler, and stream object processor during the message handling process. The stream state table values are modifiable by the stream data detector, 410, and stream vector handler, 420 and by associated functions therein. The data records which comprise the state table, 500, include:

TABLE 1

State Table Descriptors

| Record Identifier | Data Length |
| --- | --- |
| Vector Identifier | 4 bytes |
| Acknowledgement Number | 4 bytes |
| Sequence Number | 4 bytes |
| Protocol Identifier | 2 bytes |
| Object Identifier | 2 bytes |
| Data Start Pointer | 4 bytes |
| Current Data Pointer | 4 bytes |
| Bypass Mode | Boolean |

Given that the stream identifier, 501, has been recorded in the state table, 500, this can invoke a state response back to the stream vector handler, 420, via path 425 with a binary action directive. The stream vector handler, 420, also resumes control of the active message pointer value in memory which is now linked to the vector identifier, 501, as defined in the state table, 500.

Based on the stream state table response, the active data packet pointer value can enter two sequential states. In the first sequential case, the pointer is passed directly to the outbound interface transmission queue and the stream vector handler, 420, releases the pointer from memory. This action to release the pointer can occur based on two internal state table conditions. The first condition exists when the stream transaction is not found in the state table and the message contains neither the observable protocol identifier, 504, nor an object identifier of interest, 505. The second condition is based on the binary decision operator value of the bypass mode field, 508. A negative value in the bypass field, 508, indicates that the stream has been registered by a vector ID, 501, entry however additional data modification is not required for the remainder of this data stream transmission. A positive value in the bypass mode field, 508, redirects the message pointer to the stream object processor function, 430 leading to the second sequential case. The second sequential case involves registering or updating the stream state table, 415, and then passing the message pointer to the stream object processor, 430, where the message can be modified based on a predefined set of algorithms, the operations of which are selected by the defined object identifier value.

Figure 6:
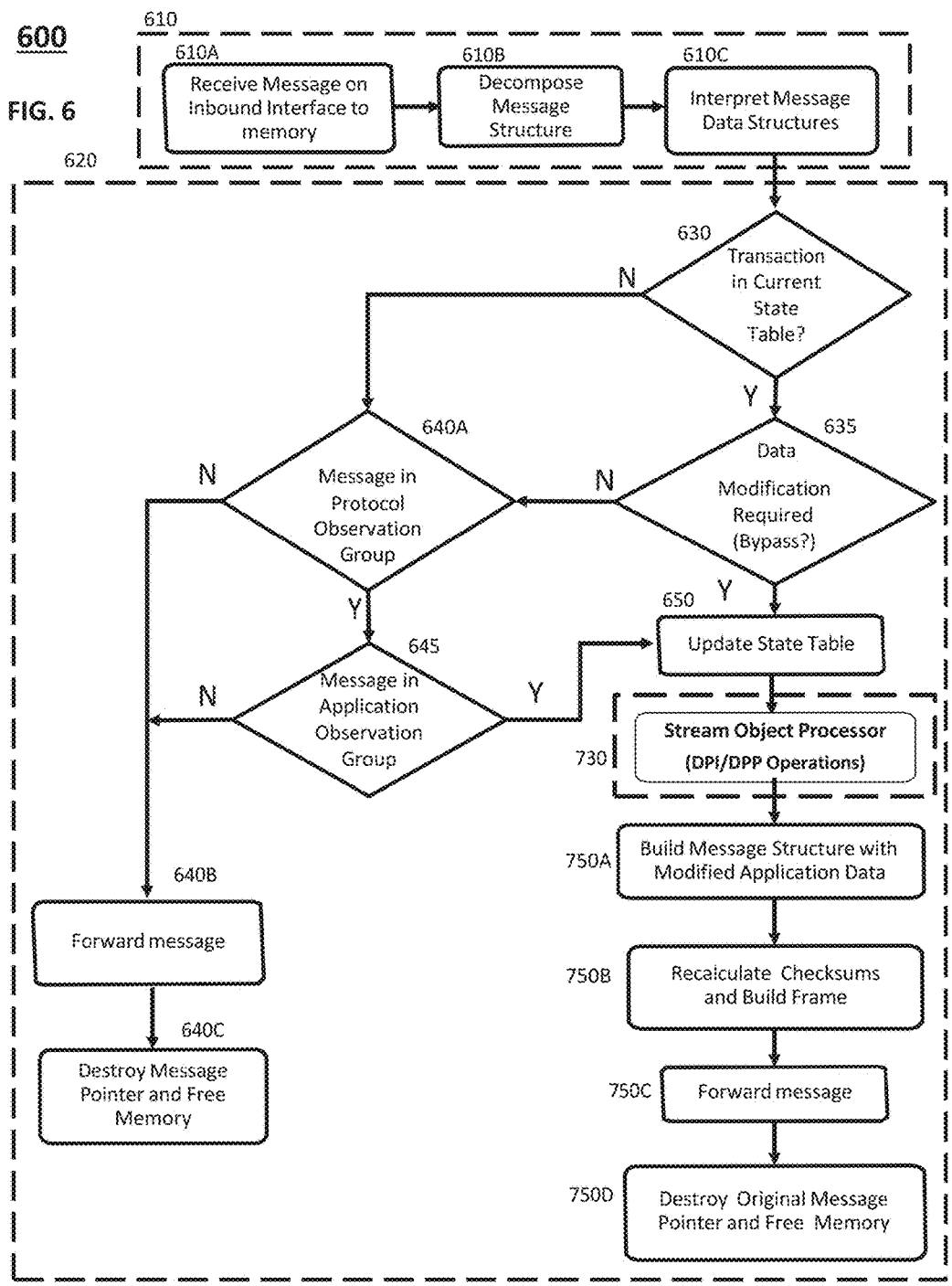
FIG. 6 represents a conditional data flow diagram of the RSU.

FIG. 6 is a flowchart illustrating generalized operation of an embodiment when implemented as an inbound RSU. FIG. 6 serves as a recapitulation of functional block diagram structures in FIG. 4 and is provided to further elucidate embodiments depicted in FIG. 1 and FIG. 2 as systems that are used for real-time monitoring, interception, modification, and retransmission of unidirectional network message traffic. Block 610 in FIG. 6 describes the specific processes performed by the RSU in the monitoring, interception, decomposition, and analysis, and active data vector handling phases of message processing. With the stream state defined, the flow proceeds to the decision point, 630, which is a query to the state table, 500. At this point a path between two sequential state case selections is made between block 635 and blocks 640A-B. The result of these two paths will either be a data modification path of action via the state table update action, block 650, or the original message will be forwarded to the intended recipient via block actions 645A-B. The output of the update state table action, block 650, leads to the DPI/DPP entry operation, block 730, further depicted in FIG. 7 and FIG. 8.

Figure 7:
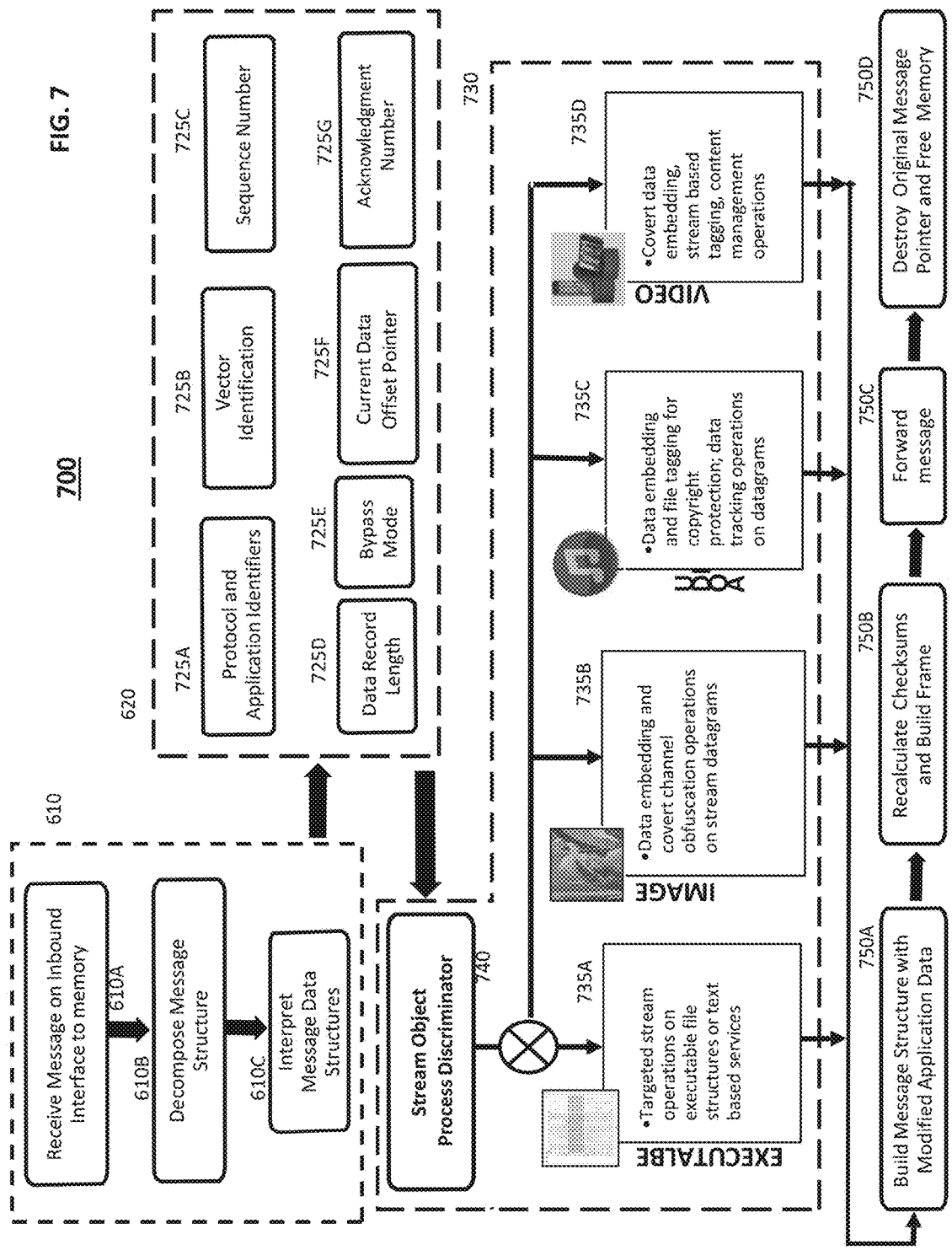
FIG. 7 depicts three main operations groups which comprise the methods used in the disclosure to perform specific data modification processes on the identified stream data object within the real-time data stream.

FIG. 7 depicts three main operations groups, 610, 620, and 730. Block 610 is a summary of the RSU processes which will lead to the DPI/DPP message modification functions performed within block 730. Block 620 delineates the state table, 500, information constructs that were discerned from the asynchronous, unidirectional message stream traffic for which the states are targeted and updated prior to entry into the DPI/DPP modification functions, block 730. Block 730 represents the processes by which messages are modified. As such, Block 730 describes the processes and methods used in the disclosure to perform specific data modification processes on the identified stream data object within the real-time data stream. Moreover, using the application level data starting bit position, select data modification algorithms will course over to bit positions of the stream file which may span from the first datagram in the stream to any number of datagram including all within a given stream. In all cases the stream vector handler, 420, maintains state across the data stream, updating the stream state table and releasing the data pointers to ensure the message is properly reconstructed and delivered to the intended recipient.

The details of each message modification process begins when the message pointer is passed to the object processor block 730, as shown in FIG. 6 and FIG. 7. The stream object process discriminator, function block 740, selects and passes the file descriptor to the sub-processor functions, 735A-D, based on the predefined object identifier. The object discriminator will classify the object as one of four data types, namely text or executable file, 735A, still image file, 735B, audio file, 735C, or video structure, 735D. Predefined exemplary action classes that may be applied on the application data field of the message are shown in block 735A-D. These action classes are not to be interpreted as limiting and are merely illustrative of the selection processes involved in this phase of the message handling.

Figure 8:
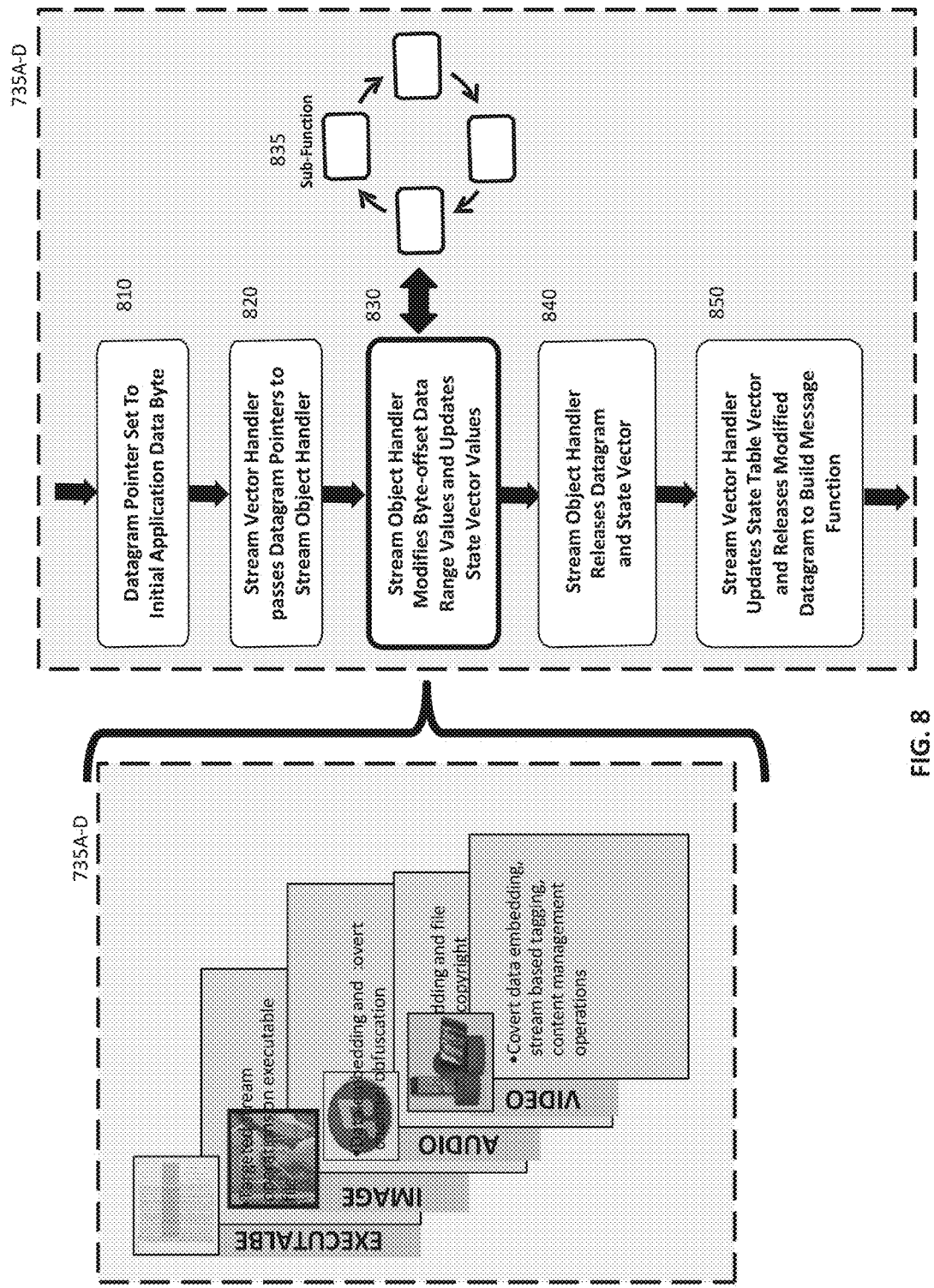
FIG. 8 shows the sub-processes involved in the actual modification of the specific application data record fields of the message.

Next, FIG. 8 shows the sub-processes involved in the actual modification of the specific application data record fields of the message. Block 810 shows that current pointer is set to the initial application data byte of interest within the stream file. An internal function, stream object handler, block 820, receives the state and data reference pointers, and begins processing the intended data modifications using a series of application specific sub-functions and depicted in block 830 and block 835. Once the intended data changes are made to the message file, the state table is updated, 840-850, and the file descriptor of the modified message is passed to the stream vector handler, 430, where block process 750A-750D are performed, as shown in FIG. 6 and FIG. 7.

Figure 9:
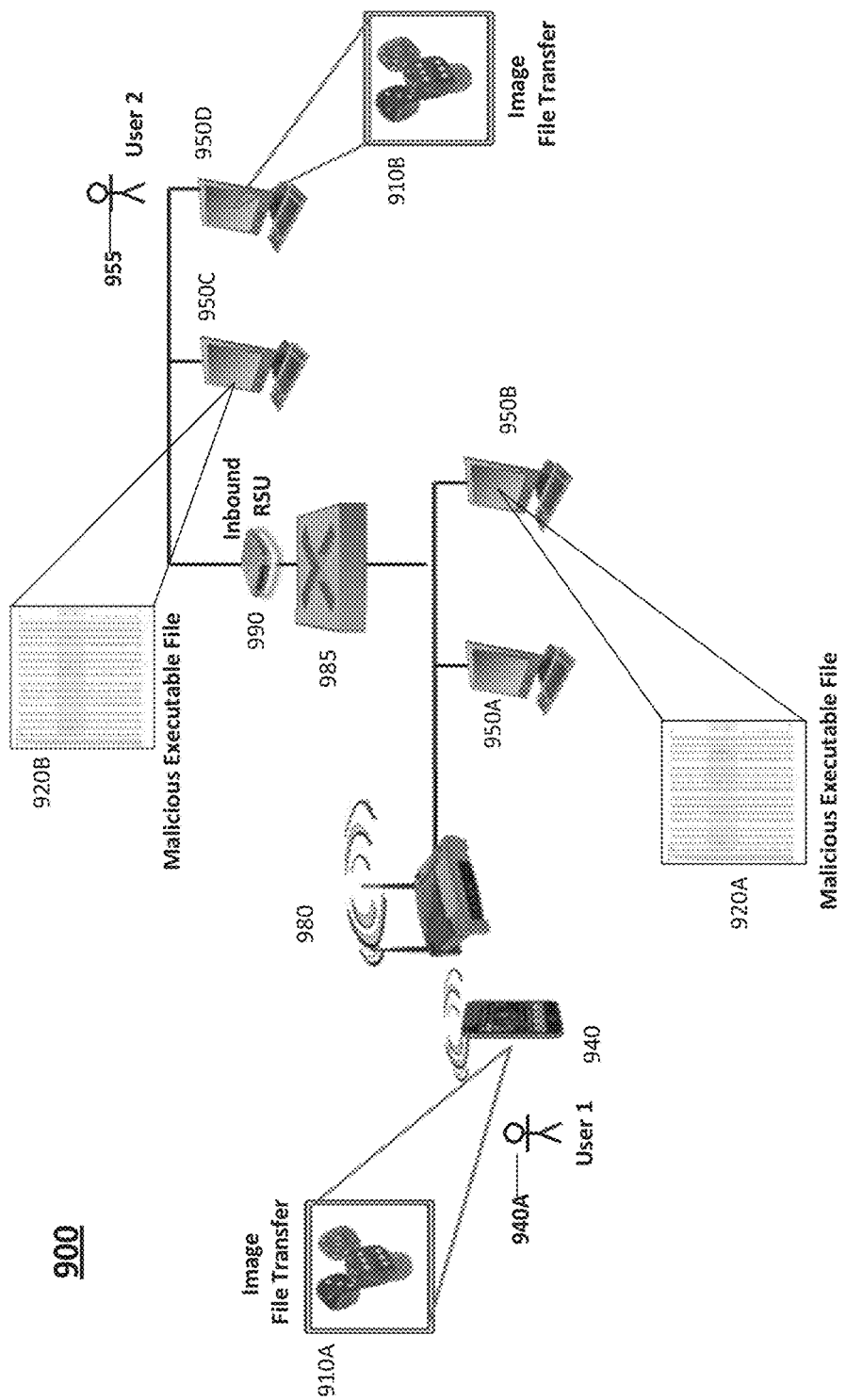
FIG. 9 is an illustration of a simple communications network depicting an image having being subsequently displayed after transmitted over the network between two separate networks connected processing systems.

An illustrative example is provided in which a streamed data file is intercepted by an intermediating device situated between two end user nodes on a data network. The series of depictions over FIG. 9 to FIG. 14 represent an exemplary multimedia file transfer between user nodes on a network employing an embodiment. FIG. 9 depicts internetworked end user nodes 940 and 950A-D with an intermediating inbound RSU, 990, situated on the network such as to reside between the group of user nodes 950C-D and the other user processing nodes and devices on the network, 900. In this scenario User1, 940A, will send an image object, 910A, to User2, 955A. User1 has a cellular phone, 940, connected to the local Wi-Fi node, 980, while User2 is waiting for the image file on arrive on the desktop processor, 950D.

Figure 10:
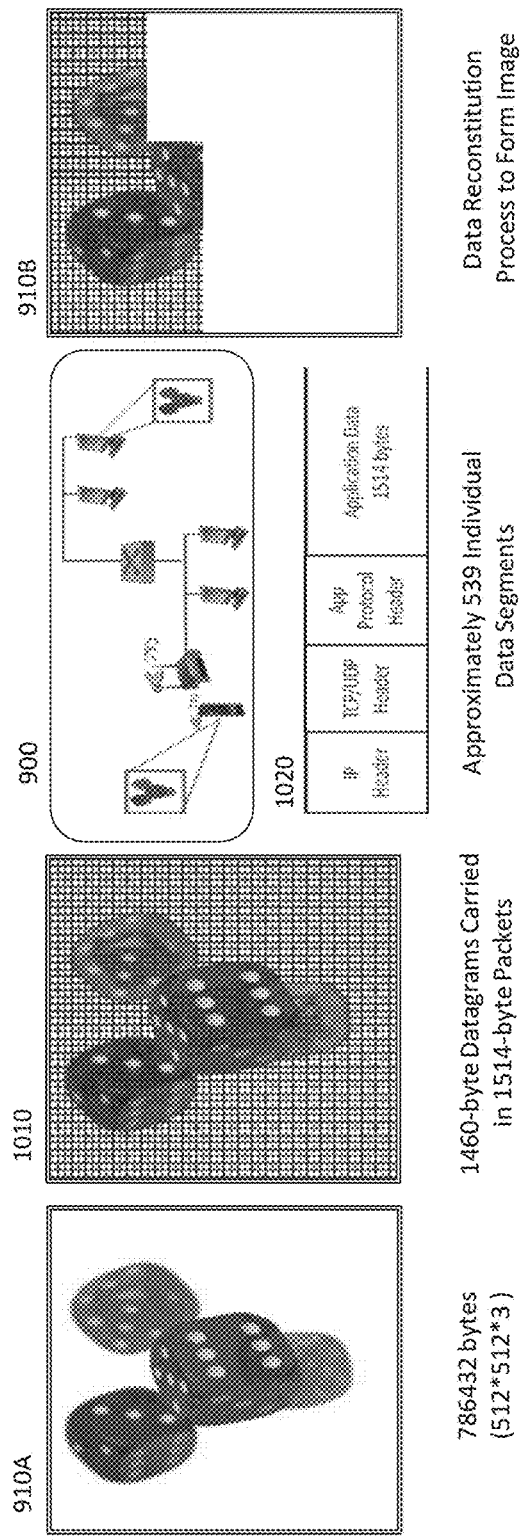
FIG. 10 is an illustration which depicts the concept of digital file segmentation for transmitting files over a packet based network environment.

FIG. 10 depicts how a typical multimedia formatted file, 910A will be segmented into a plurality of segmented messages in preparation for transmission over an Ethernet network using the TCP/IP protocol suite to manage the transfer between nodes. The size of the file illustrated is 786,432 bytes. This data message size for a standard Ethernet network is 1460 bytes. The segmentation process used by TCP can result in approximately 539 individual message segments as shown in blocks 1010 and 1020 of FIG. 10. Block 910B of FIG. 10 depicts the reconstitution of the original image, from the transferred message segments.

Figure 11:
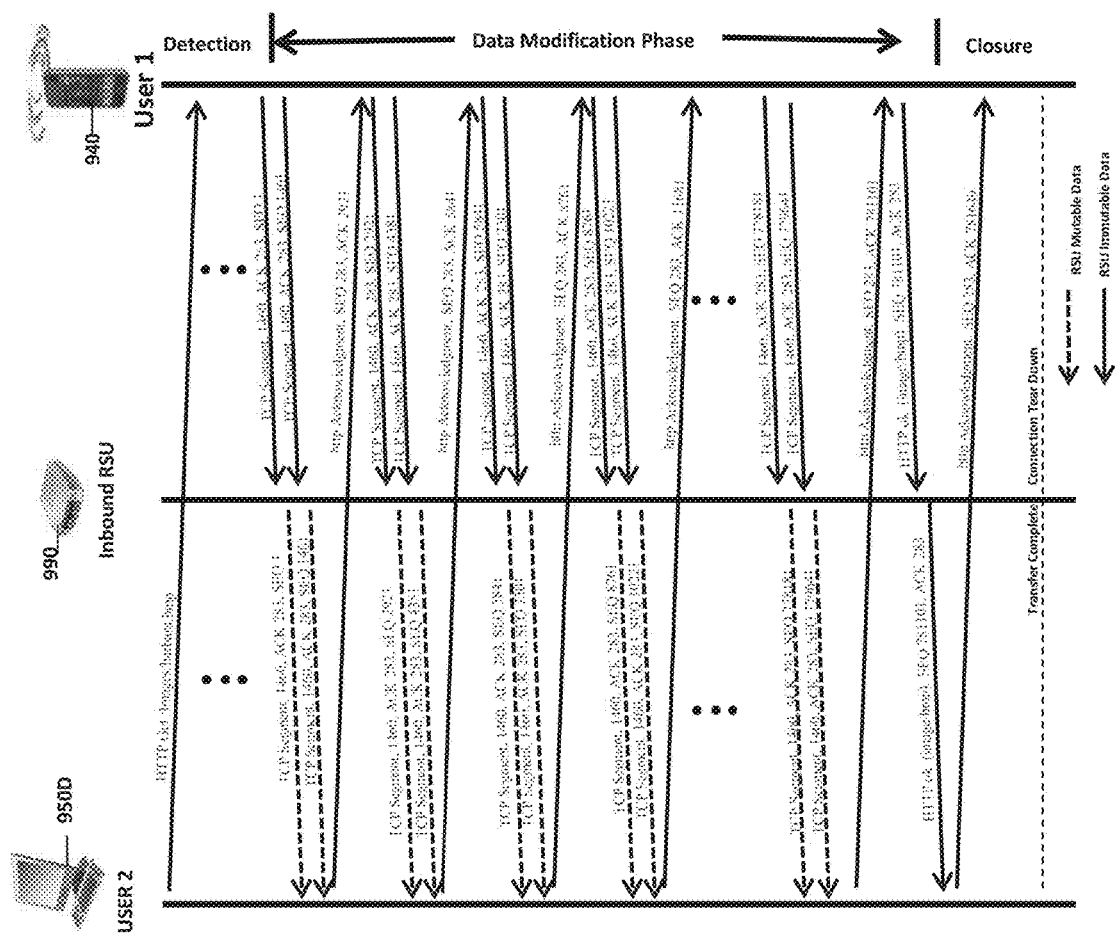
FIG. 11 is an illustration of a common network stream transaction flow for the inbound facing systems shown in FIG. 1 and FIG. 2, or other systems used for the identification of patterns and modification of data in stateful transactions.

FIG. 11 is a high level process flow diagram that describes the datagram stream flow into, within, and out of the system when configured as an inbound data facing device as described in the embodiment of the present disclosure and as implemented in this exemplary description.

Referring to FIG. 11, all message traffic originating from User2 and transferring to User1 pass through the inbound RSU, 990, with no interaction or interference by the RSU device, 990. Moreover, the first indications by the RSU, 990, that a multimedia transfer is taking place between the two end users occurs when it detects the first data transport message containing actual image data. FIG. 12 shows this more clearly in a descriptive text output of the starting and ending phases of the image transfer using the hypertext transfer protocol (HTTP). From this output the packet (message) time, source, destination, protocol, segment length, and packet information is summarized.

Following within this data transfer is object 1210, the initial image request message from User2 to User1. This message is not observable by the intermediate RSU, 990. Following several more message exchanges, the first message which contains data is shown as object 1220. Throughout this data exchange transcript, the files containing a message length of 1514 with protocol TCP are all intercepted and process as previously described. The last message with actionable data is the message with time marking of 11.056746 seconds. The last message observed by the RSU, 990, is the non-actionable information message with time marking of 11.068997 seconds. The full image transfer time is shown to be approximate 4.45 seconds.

Figure 13:
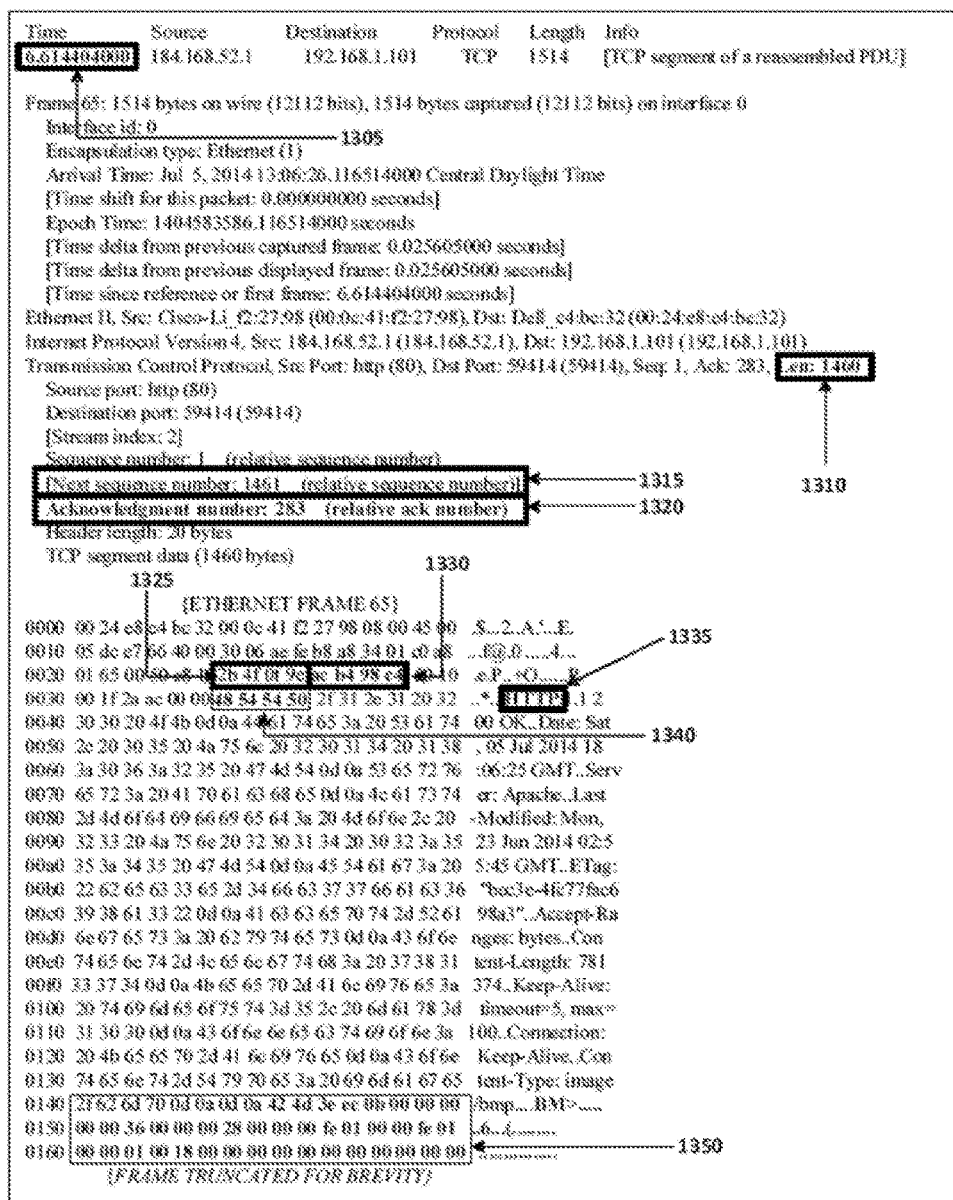
FIG. 13 is a network packet capture illustration showing essential data elements for system which captures, analyzes, and operates on data streams for inbound facing systems shown in FIG. 1 and FIG. 2 or other systems used for the identification of patterns and modification of data in stateful transactions.
Figure 14:
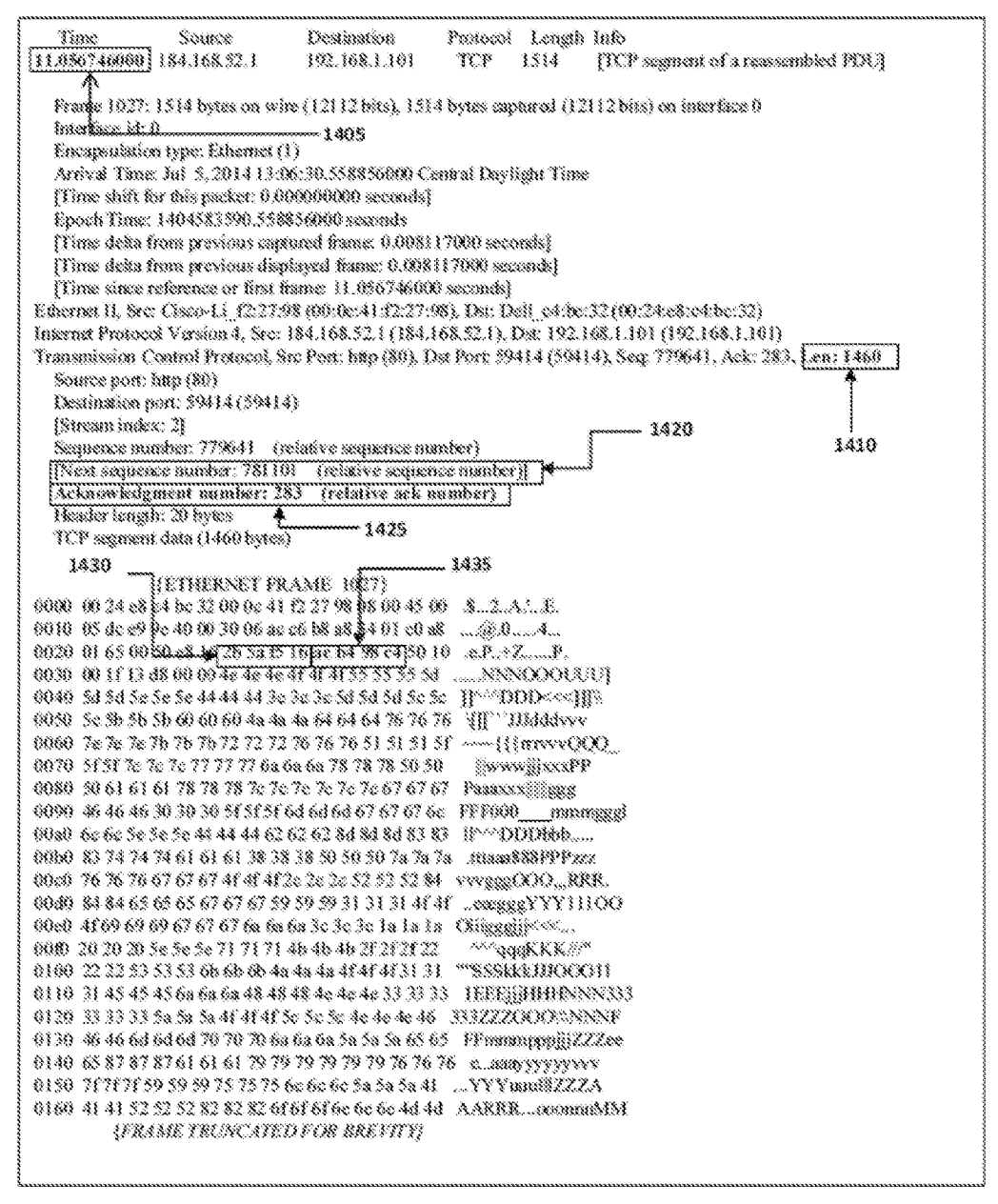

FIG. 13 and FIG. 14 are packet frame captures of the first data packet and the last data packet, respectively. The importance of these two simple figures cannot be overemphasized for practitioners aspiring to gain the full knowledge of how the various embodiments quickly establish and maintain a consistent stream state over the brief seconds that a file transfer occurs. FIG. 13 contains key pieces of information that are used in the disclosure to establish the immediate session state for the stream. The first key element is indicated by object 1320, the session acknowledgement number. This number is used within the TCP protocol to verify end-to-end delivery of each stream segment. Observing the first packet structure value, 0xAC 84 98 C4 and then comparing it to the last packet structure in FIG. 14, it is clearly seen that the acknowledgement field value does not actually change over the streams lifetime. This fact, coupled with the identification of the TCP protocol definitively establishes a unique stream tracking element. A third key parameter observable in FIG. 13 is the sequence number, marked as object 1325. This value will change over the length of the data transfer. Its value contribution is that it is used to identify and maintain the stream data pointer. Essentially the exact location of any given bit can be determined by maintaining the proper offset from this initial sequence number.

Referring to the state table, 500, it is shown that the current sequence number, 503, the initial sequence number, 506, and the current data pointer, 507, are all either direct or derived values in the state table. The final two parameters found in FIG. 13 which are key elements for the operation of various embodiments are objects 1340 and 1350. The rapid identification of this first element, 1340, can occur during the process flow operation decision point 640A-B, shown in FIG. 6. The rapid execution of this decision point relies on quickly finding the protocol observation group, HTTP, in this case, within the application (OSI level 7) portion of the message. Finding this value results in the process flow immediately moving to the stream object processor, 730, as shown in FIG. 6 and FIG. 7. This entry into the DPP functionality where, for this exemplary data segment, would identify object 1350, or a bit mapped image transfer. The sub-function operations, 835, would be invoked via the 730 to 740 decision functions resulting in the data manipulation operations to begin, on this first captured data segment, and continuing until the selected algorithm concluded at a selected point in the session stream. In this exemplary embodiment of the patent, no data was actually modified during the process of the stream data transfer of object 910A. The processes employed by the disclosure that include intercepting, analyzing, reconstituting, and forwarding of messages was fully described.

Exemplary Implementation Illustrating an Effective Mitigation of Zero-Day Malware Using Message Modification Functions on Active Executable File Types.

An exemplary implementation is now described in which one embodiment of the system includes the means and methods to implement computer system exploitation mitigation processes against zero-day malicious software directed against software based network connected systems. FIG. 9 depicts internetworked end user nodes 920A and 950C with an intermediating inbound RSU, 990, situated on the network such as to reside between these user nodes. In this scenario User3, 940B, will send an executable file object, 920A, to User4, 955B. In this scenario, the executable object, 920A, may or may not contain malicious logic and each user may or may not be aware of the presence or absence of malicious logic within the executable. In this situation, an actual double-blind conditional test of the file is in play. The inbound RSU, 990, system will, however, treat all active executable files that transfer across its interfaces as malicious and will perform a series of actions to nullify all inbound executable files before they are delivered to processing nodes, essentially rendering the file non-functional and non-executable.

Figure 15:
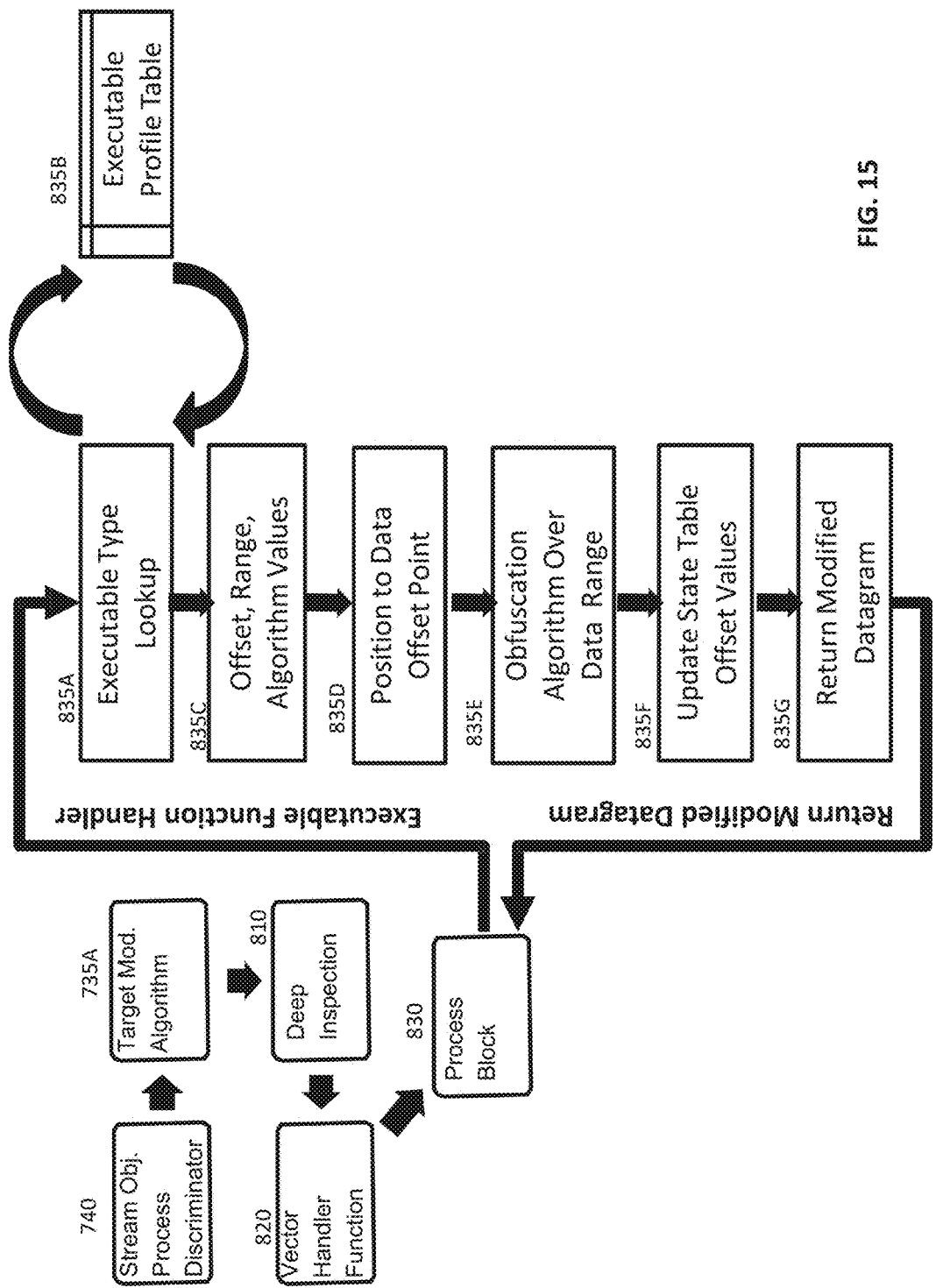
FIG. 15 shows the processes and data modifications involved at the stream function handler level and below when the object discriminator selected the application being an active executable file.

The preceding descriptive narrative of the various embodiments, and all of the heretofore mentioned processes and methods leading up to the point of data message modification remain in effect to this point. Some of these unlimited methods or processes include the interception, handling, analysis, and the structural classification of the message objects in preparation for possible deep packet data modification. Referring to FIG. 15, block 830 depicts the major internal function state as shown in FIG. 8 where the data segment descriptor has been fully identified by the stream object process discriminator, 740, as how and by which target modification algorithm, 735A, the data segment is to be modified. The data segment descriptor has also undergone deep inspection to locate and identify the application data starting point, 810, and has been passed to process block 830 via the vector handler function, 820 with all of the appropriate state vector parameters. The next function block, 835A, with data pointer at the start of the application field, passes the 2-byte object identifier value to an executable profile lookup table function, 835B. This table, 835B, contains specific algorithmic processing inputs that are passed to the obfuscation function, 835E, by the functions 835C-D, which preload the function, 835E.

FIG. 16 is a descriptive text output of the starting and ending phases of an executable file transfer using the hypertext transfer protocol (HTTP) which identifies the time, source, destination, protocol, segment length, and packet information. FIG. 16 identifies an item 1610 which is a record of the first recordable data message flowing from User3 to User4 that is observable and actionable by the intermediate RSU, 990. This first message occurs at time 0.123348 seconds. Following within this data stream, a series of messages having a length value of between 672 and 1514 can be seen in FIG. 16. Some embodiments are able to maintain stream state for packets in various TCP conditions that can include, but is not limited to, recovery after lost message segments, duplicate segment transmissions, and out of order segment delivery. The TCP stream state is negotiated and managed by the end node processor which are communicating using the connected oriented protocol. The tasks performed by the RSU, 990, are completely independent of the actual stream state this is negotiated during the end to end communications exchange.

The various embodiments manage logically contiguous message stream state during these inherent variations in the TCP exchange by employing its own internal functions and processes using parameters defined in Table 1. It is observable that the last actionable message intercepted by the RSU defined by end-of-stream markers, as shown on FIG. 12, object marker 1230, or other suitable methods that take advantage of the fixed, data structure format in the state table definitions.

Figure 17:
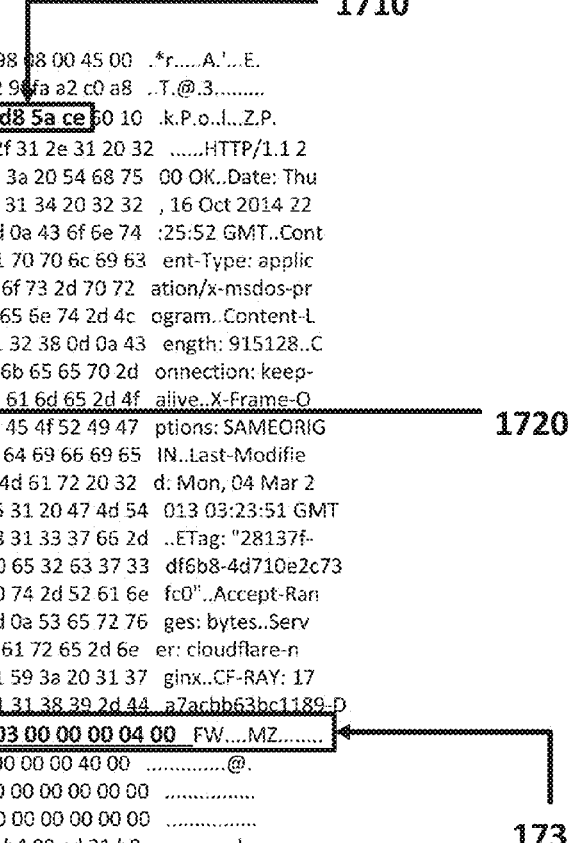
FIG. 17 is a network packet capture illustration of the first inbound packet captured and analyzed by the RSU showing essential data elements that the system uses for object discrimination and selection and the identification of key parametric elements to track stateful transactions during and active executable data transfer.

Continuing with this exemplary implementation which describes message modification actions, FIG. 17, shows the Ethernet frame capture and data structures for the first actionable captured message, depicted in FIG. 9 as item 990. This data segment is also referenced as item 1610 of FIG. 16, having a time mark of 0.1233480 seconds. In FIG. 17, item 1710 identifies the data segment acknowledgement number, item 1720 identifies the application protocol used in the TCP stream, and item 1730 references the object identifier, which is a x86 Intel architecture executable file as defined by the file descriptor or magic numbers 0x4d 0x5e. These items are used, as described, in the state table for message stream tracking.

Figure 18:
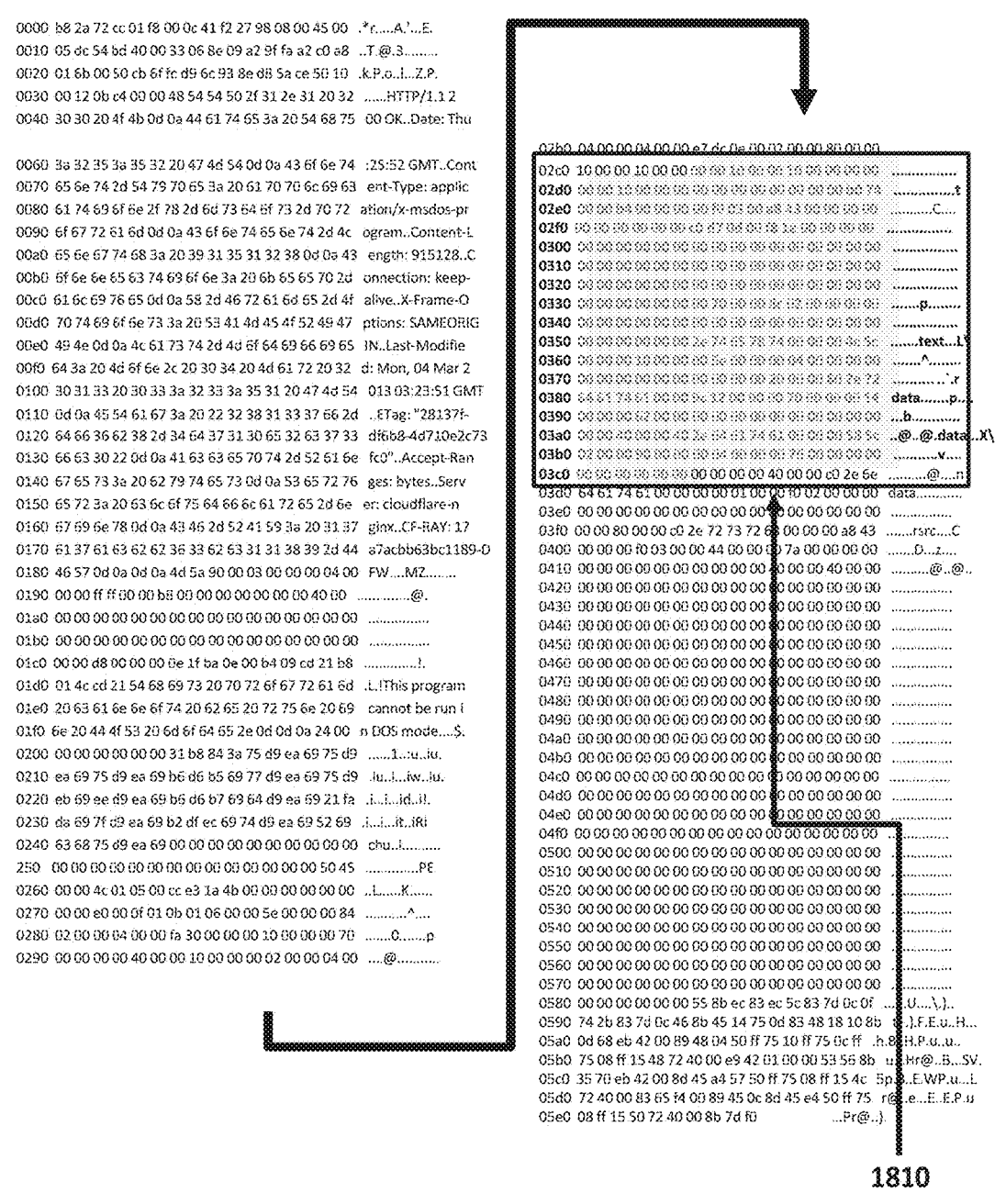

FIG. 18 shows, in its entirety, the same first message as intercepted by the various embodiment, depicted in FIG. 9, as item 990. Referring back to FIG. 15, it is shown that the message object discriminator, block 740, had selected the target object processor, 735A, which is the executable object processor function. Following the process flow in FIG. 15, control of the data segment descriptor is passed to block 835A which, given the known state parameters of the stream and the object identifier (x86 Intel executable file) queries the function parameters from table 835B and sequentially inputs the results into block 835E, the actual data modification algorithm. The function parameters used by the obfuscation algorithm may include the offset byte to begin the modification, length in bytes of the change, and the specific reversible or one-way modification algorithm to be used by the function block 835E. Referring again to FIG. 18, it is seen that the offset value is defined by decimal offset 320 or 0x0140 and the range is decimal offset 576 or 0x0240 given a total change vector length of 255 bytes. It can be independently verified that modifications to this defined section of an executable file will nullify that file, rendering it non-executable.

Figure 19:
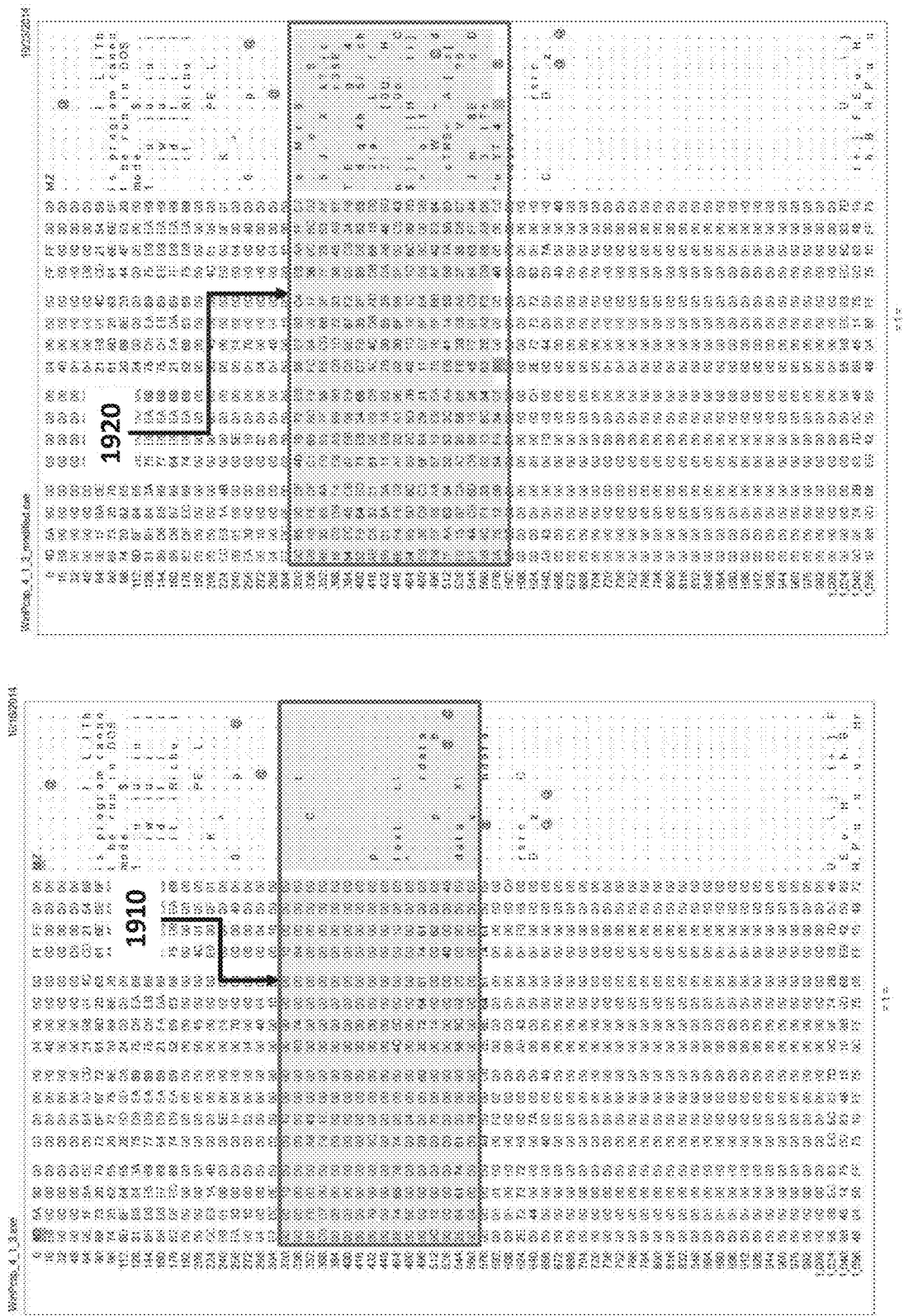
FIG. 19 shows a portion of the data segment of packet number 1 in the before and after state of active file nullification using a simple byte value rotation algorithm.
Figure 20:
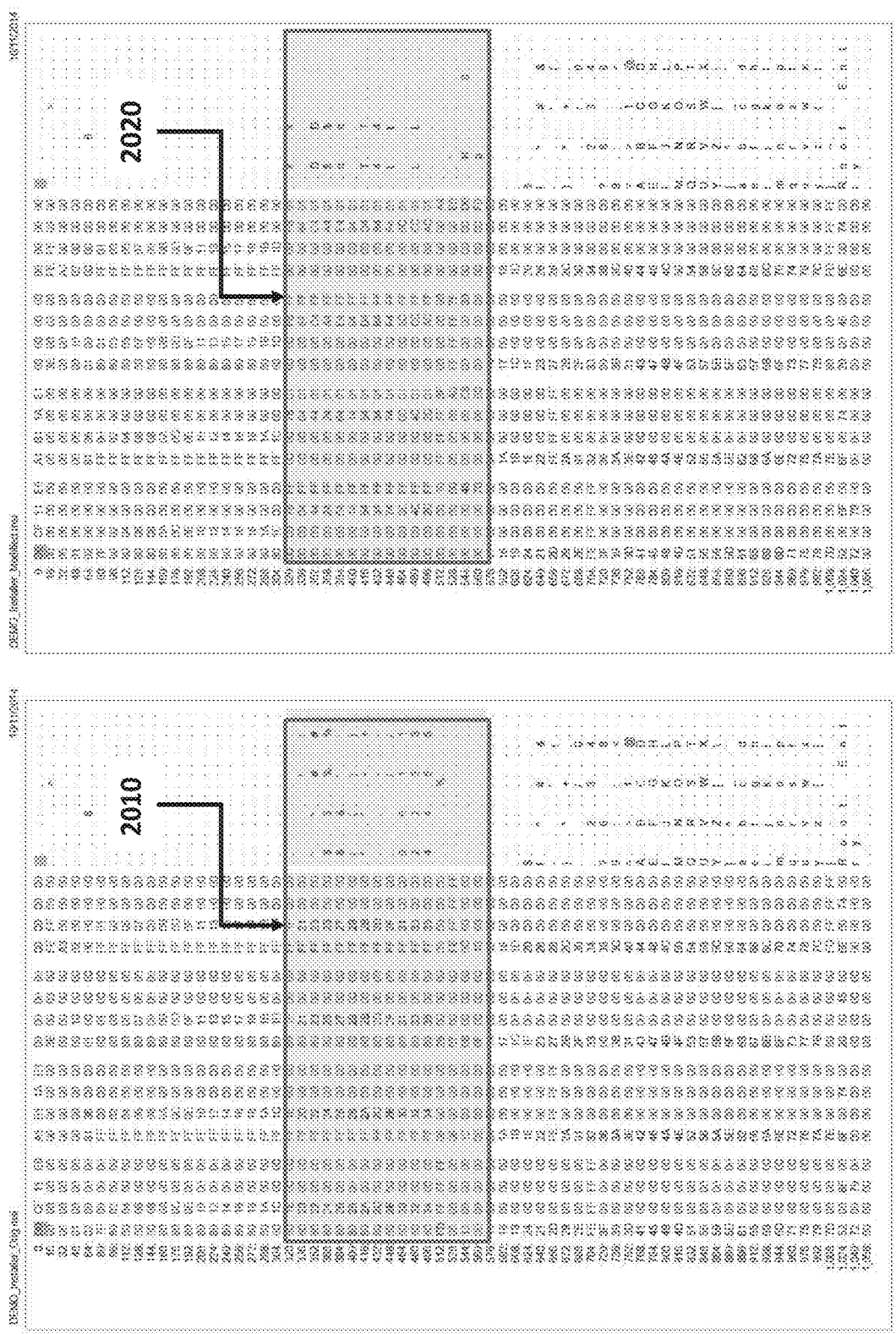
FIG. 20 shows a portion of the data segment of another exemplary packet number 1 file transfer in the before and after state of active file nullification using a simple binary rotation algorithm.

FIG. 19 and FIG. 20 depict portions of two separate executable file formats that were subjected to the active file mitigation functions. FIG. 19 shows the beginning section of an executable files initial data segment before it enters the patent device and then immediately after existing the device. Active file nullification is achieved using a simple byte value rotation algorithm over the targeted file range. This byte rotation algorithm is completely reversible. FIG. 20 shows the beginning section of a MICROSOFT installer function files initial data segment before it enters the patent device and then immediately after existing the device. This file was obfuscated and effectively nullified simple binary rotation algorithm over the targeted file range. The simplified rotation algorithms are presented for illustrative purposes only and for ease of verification of the modification actions. A vast plurality of highly efficient, reversible functions are available for use in these data obfuscation functions. Moreover, it is acknowledged that the file type, Demo_Installer_Orig.msi, is not to be considered an active executable, it may however represent a potential threat to end user systems due to the fact that is a direct input structured file that is input for the powerful system executable, the system installer, found on all Windows Operating Systems. Thus, the ability to selectively identify and target any common file structure for format disruption is a unique feature of some embodiments.

In this present illustrative embodiment, we have described the unique ability to, intercept a plurality of unidirectional streamed stateful messages in a real-time network environment and subsequently analyze, categorize, and neutralize active executable files which are being delivered to end user systems, preventing potential exploitations from being perpetrated against these end user processing systems. The described disclosure itself is completely unaffected by any potential malware threats due to the fact that the system does not store, nor does it attempt to execute any files or data that transverses the system. Messages or data packets are intercepted, analyzed, processed for modifications, repackaged, retransmitted, and immediately flushed from the system, in turn. As a result of this admittedly indiscriminate active file disruption functionality, all active executable files which includes not only the known and unknown malware (zero-day exploits) and spyware, but also all of the known and unknown beneficial executable files will be disrupted and disabled. Examples of beneficial executable files include application and operating system software patches, security patches and updates, hot fixes from major operating system vendors, and perhaps activities related to configuration file transfers from system or security administrators. Other legitimate file that will be disrupted by the present disclosure include compressed file formats (e.g., zipped, WinZip, 7-Zip, G-Zip) due to the fact that malware will often transport additional malfeasant executables in compressed data modes in an attempt to mitigate detection by string matching algorithms. In order to rationalize the proposed "total active file disruption" approach, a new model for end-system security must be considered.

The current end-system malware defense model is based on techniques such as active file containment, digital sandboxing techniques, or both active and off-line file scanning in an effort to detect feature sets or signature descriptors of known bad files. These approaches have had little if any affect in detecting and defending against AET and zero-day exploitation software. The approach used in the present embodiment for the protection of end-systems it to completely disable all active file types identified as potential system threats before they are delivered to the end user systems. Given the fact that malware and spyware typically operate as background processes to download unknown executable files with no user awareness, a means and methods that focuses on preventing these types of covert, unattended, and potentially malicious executable downloads is the focus of this disclosure.

Once the file is on the end system, in a nullified, benign state, additional scrutiny can applied to determine if activation of the file is in fact warranted, required, or even requested. As was described in the narrative descriptions of the present illustrative embodiment, the plurality of nullification processes that can be selected to disable the targeted file types are applied in such a method that an equally large number of reversible algorithms exist that will perfectly restore the files to their original state.

One embodiment of this reactivation and file restoration process may include a plurality of specific programmed computer applications operating on the end user system (which has received and holds the nullified file) with the proper reversing functions and sufficient security and trust assigned. This application, which may involve a plurality of authentication actions to reactivate the nullified file, could effectively and efficiently restore any file type to its original state. In one embodiment of this reversing and file restoration process, the desired reactivation may be accomplished with no end user awareness or interaction. In the case of this unattended reactivation, specialized feature vector analysis with formalized classification functions are envisioned to achieve this outcome.

Exemplary Implementation to Disrupt Covert Channels in Multimedia Carrier Files.

Given the disclosure resides between the application processing nodes, as defined by the client-server paradigm, one exemplary implementation of the various embodiments facilitates covert channel obfuscation functionality on digital multimedia files being transferred through the system. Referring to FIG. 9 again where the system 900 depicts internetworked end user nodes 940 and 950A-D having an intermediating inbound RSU, 990. In this configuration, all individually transmitted datagrams, which collectively comprise the image file, 910A, are intercepted and processed by the RSU, 990. FIG. 10 also depicted how a typical multimedia formatted file, such as 910A, is segmented into a plurality of messages (datagrams) for appropriate transmission over an Ethernet network using the TCP/IP protocol suite to manage the transfer between nodes.

Figure 21:
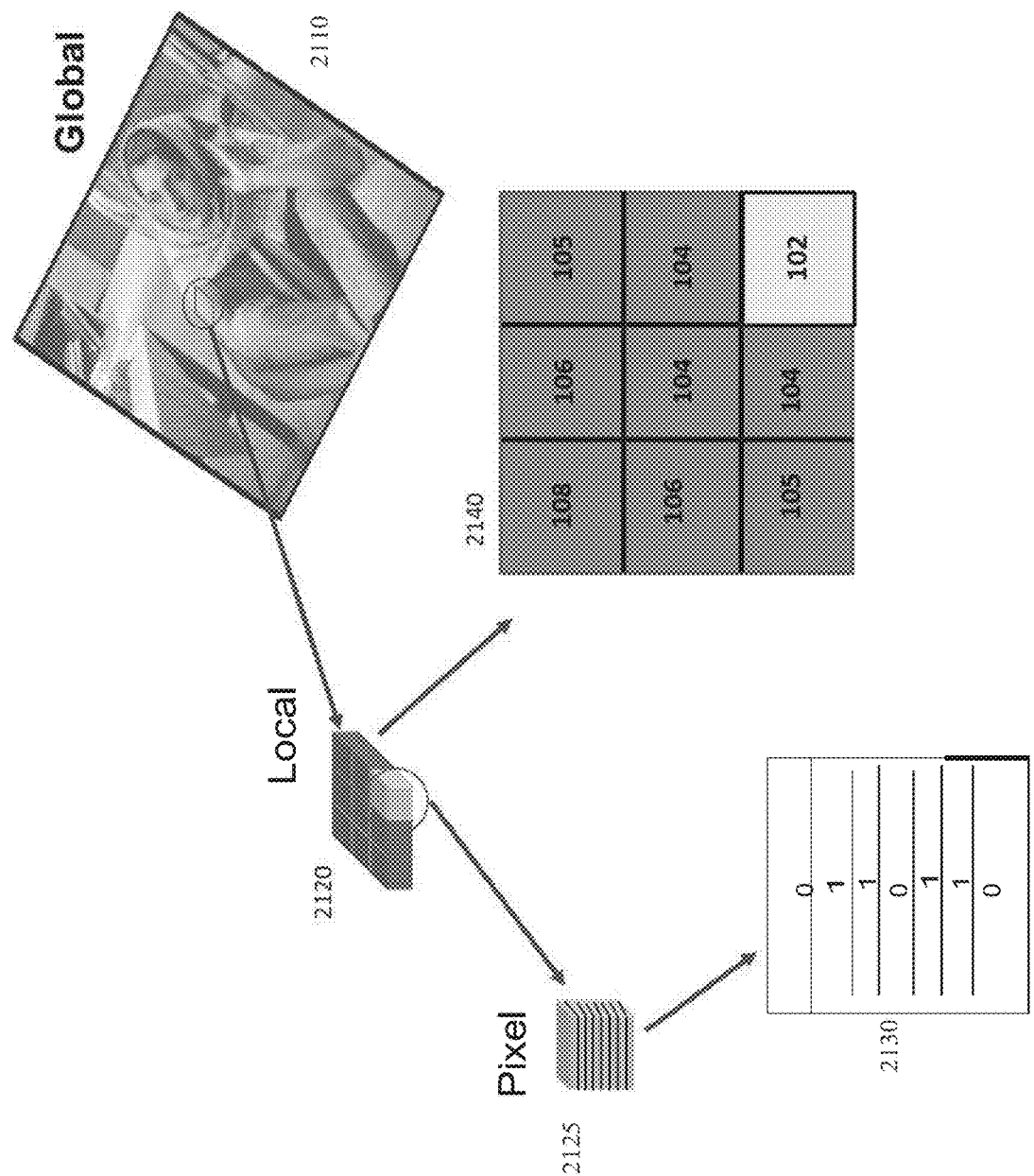
FIG. 21 depicts a simple example of a pixel value decomposition as represented by an 8-level binary representation.

In FIG. 21, the representative image, 2210, is depicted as being including an [M×N] matrix of pixel values. A representative sampling of one section of this image matrix is shown as object 2120, which is shown as a 9 element, 3×3 sub-matrix sample of image 2110. As each pixel value is known to include an 8-bit gray-scale value in the range of 0 to 255. The individually selected pixel value, 2125, is shown to have an 8-layer binary representative value of 102 by the relationships shown in objects 2130 and 2140 of this FIG. 21. With the fundamental data structure of a representative image established, the processes by which image pixel modifications, which will result in the obfuscation and subsequent loss of advantage for use of these structures for covert channel communications via digital multimedia embedding methods is now described.

Figure 22:
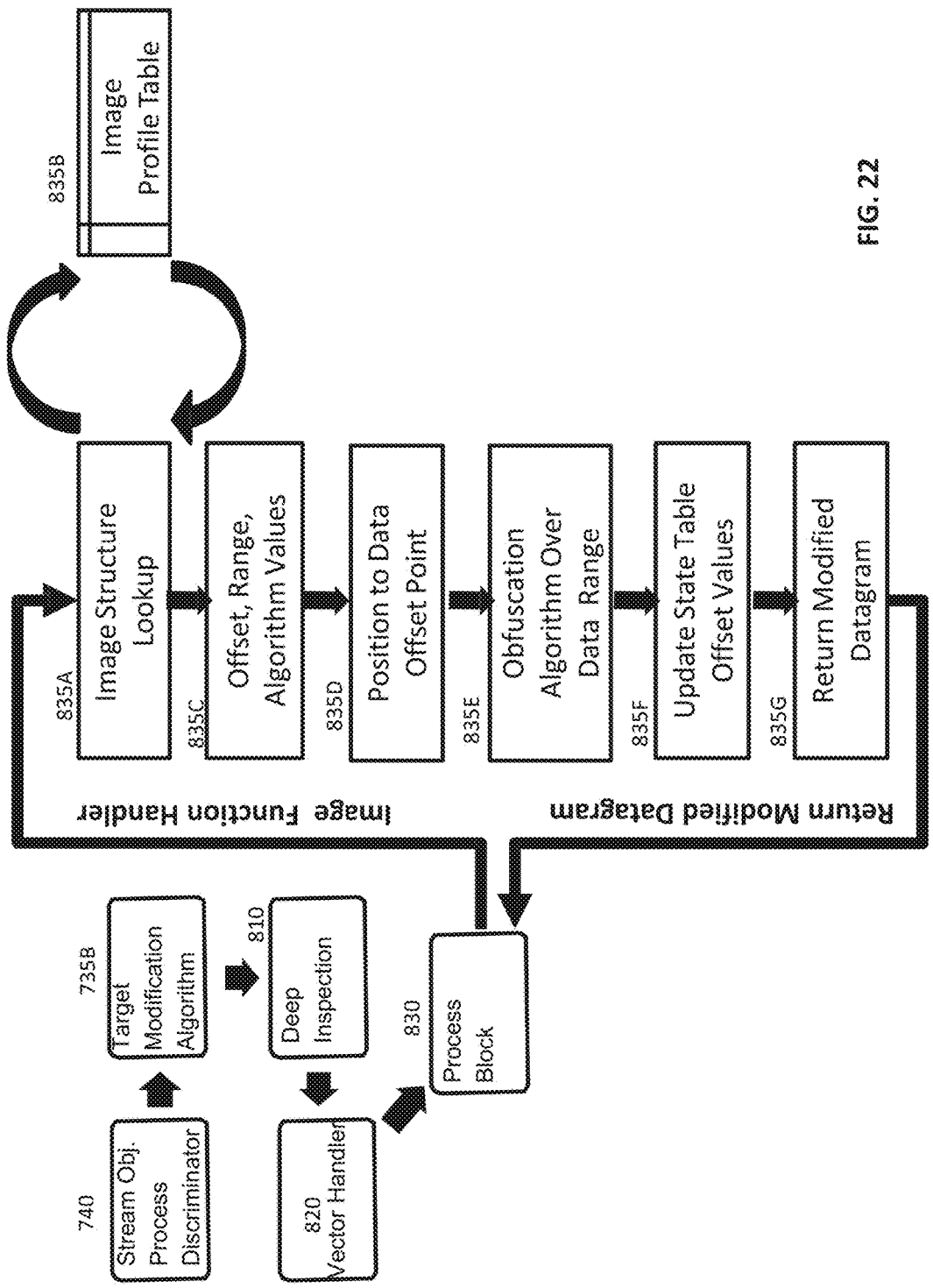
FIG. 22 shows the processes and data modifications involved at the stream function handler level and below when the object discriminator selected the application being an image to be modified by some particular obfuscation algorithm in order to disrupt any covert image channels.

Referring to FIG. 22, block 830 depicts the major internal function state as shown in FIG. 8 where the data segment descriptor has been fully identified by the stream object process discriminator, 740, as how and by which target modification algorithm, 735B, the data segment is to be modified, in this case a bitmapped image. The data segment descriptor has also undergone deep inspection to locate and identify the application data starting point, 810, and has been passed to process block 830 via the vector handler function, 820 with all of the appropriate state vector parameters. The next function block, 835A, with data pointer at the start of the application field, passes the 2-byte object identifier value to an executable profile lookup table function, 835B. This table, 835B, contains specific algorithmic processing inputs that are passed to the obfuscation function, 835E, by the functions 835C-D, which preload the function, 835E. The values returned by 835B and the obfuscation algorithm used in 835E are specific to data structure of the multimedia file being processed, in this case a bitmapped image.

Figure 23:
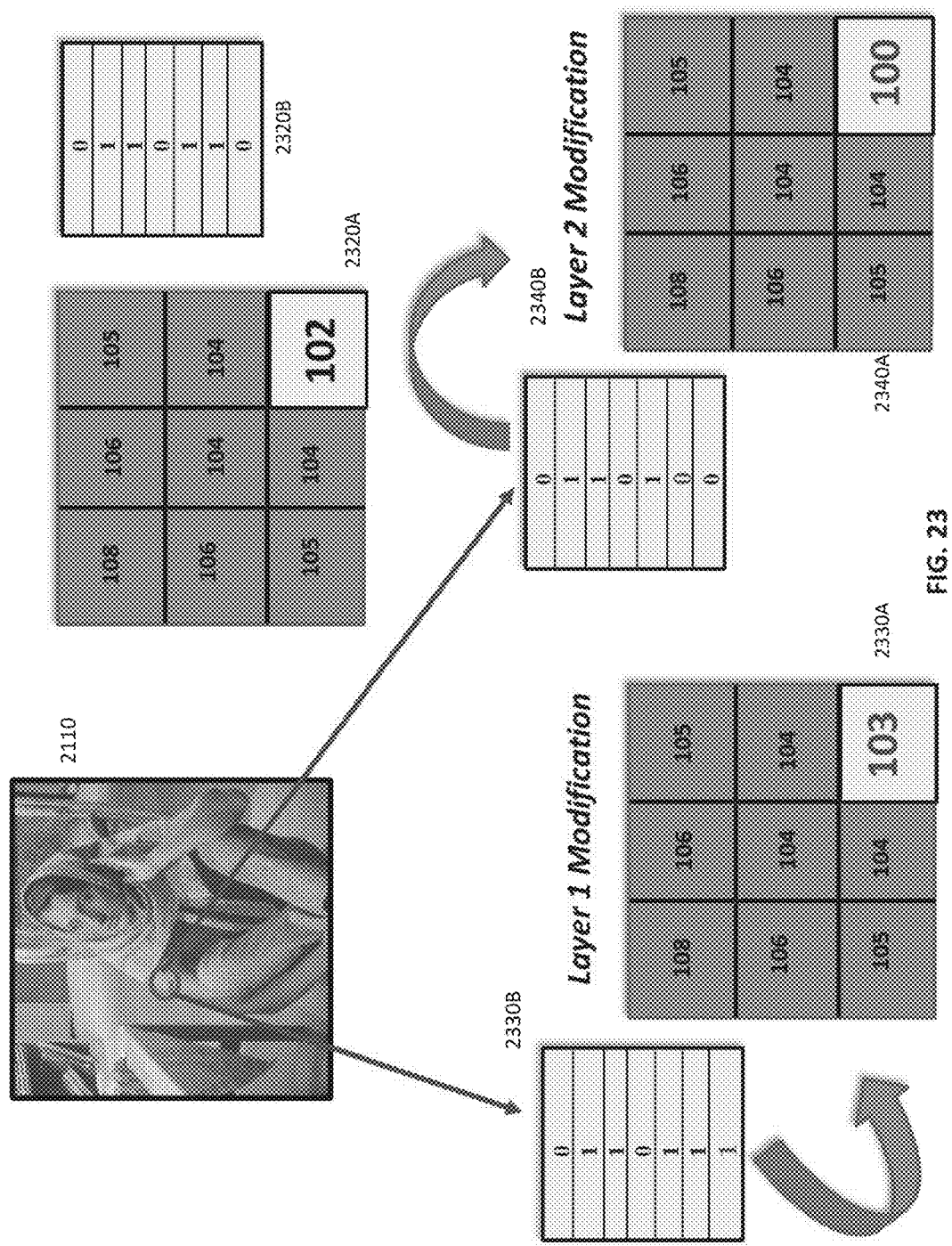
FIG. 23 depicts how specific pixel values can be changed by a layer 1 or layer 2 obfuscation algorithm during a covert channel disruption function on an image.

FIG. 23 shows the same image, 2110, with the pixel value before modification, 2320A, and the values after modification, 2330A and 2340B. Referencing FIG. 8, the parameters passed to the obfuscation function, 835E, by the presets in 835C and 835B are used to determine the effective change of the pixel value as either a layer one, 2330B, or layer two, 2340B, modification.

Figure 24:
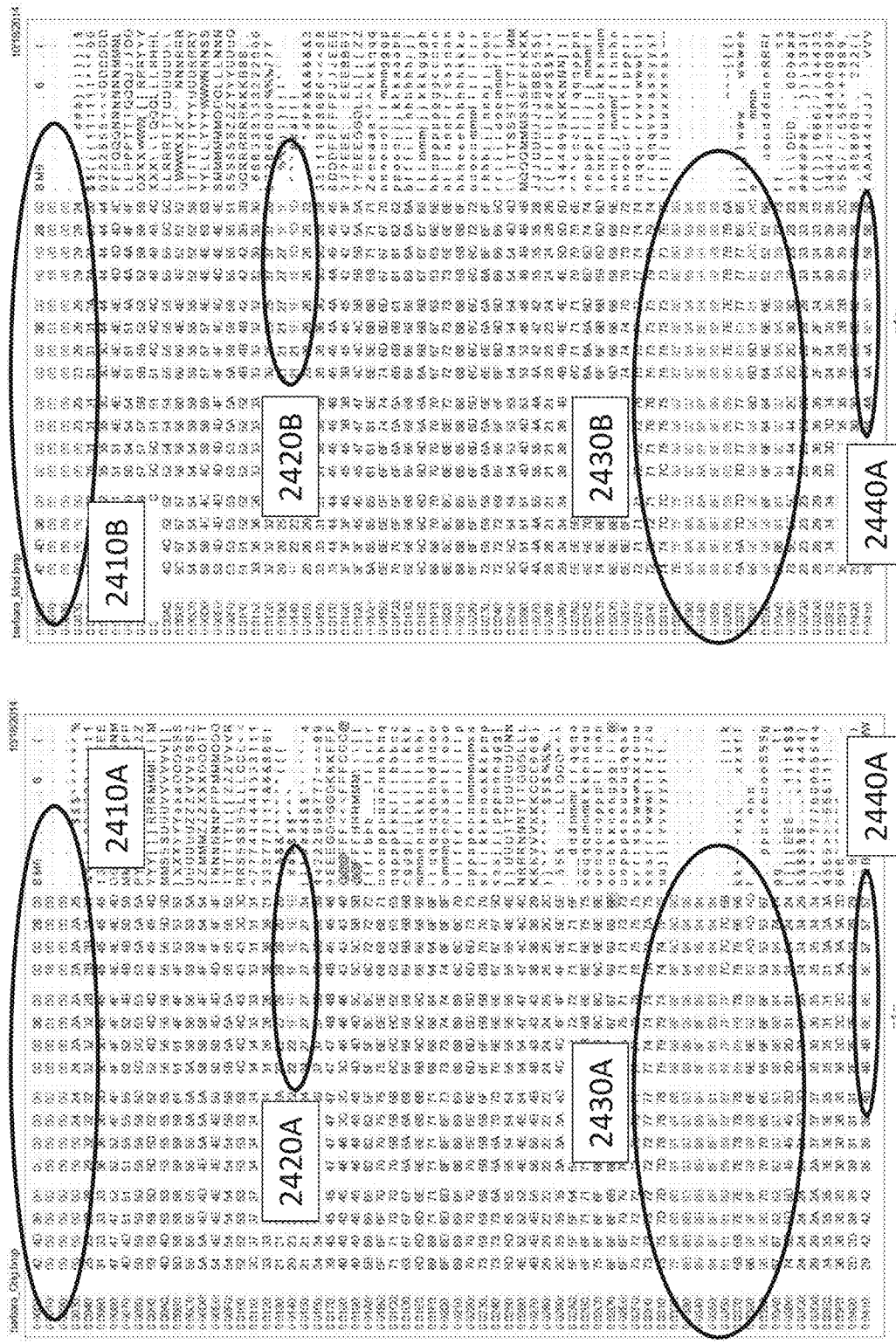
FIG. 24 shows a portion of the first packet data section of an image transfer session in a before and after state following a layer 1 obfuscation function.
Figure 25:
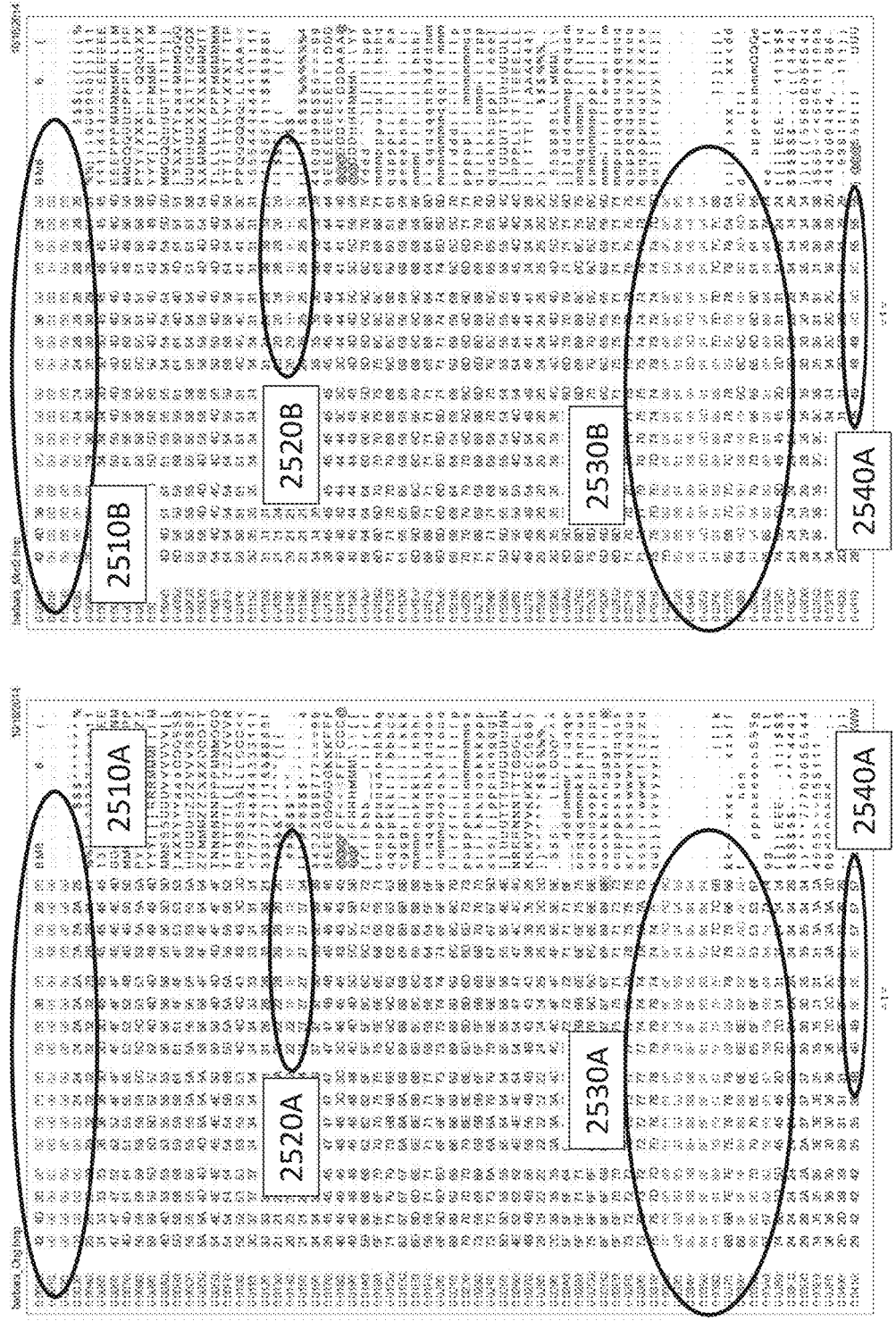
FIG. 25 shows a portion of the first packet data section of an image transfer session in a before and after state following a layer 2 obfuscation function.
Figure 26:
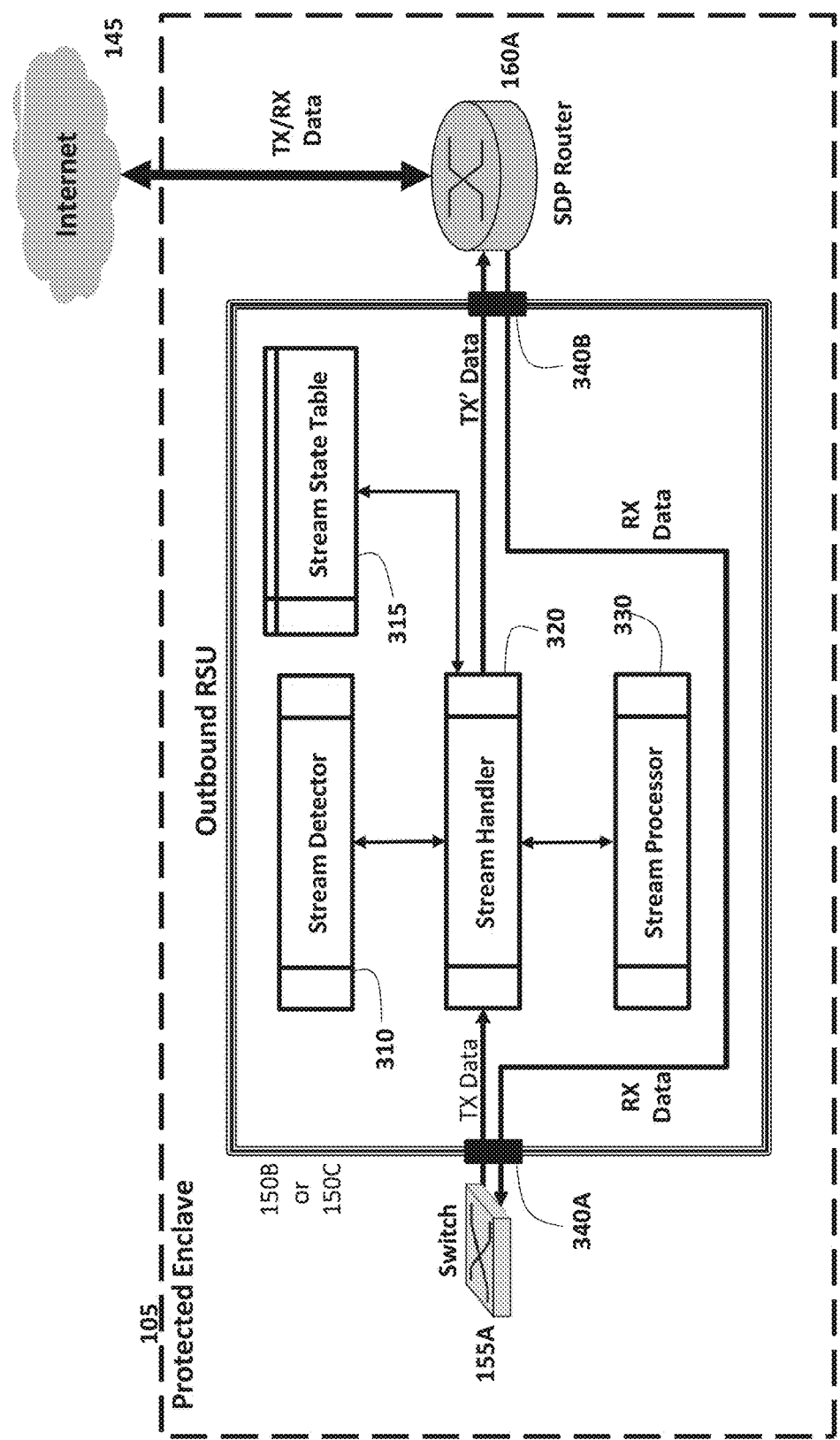
FIG. 26 is a block diagram of the RSU system when implemented as an inbound data facing device, showing the block diagrams for a generalized overview of a system for the identification of patterns and modification of identified datagrams in a stateful network transaction.

FIG. 24 shows a portion of the first datagram capture of the image file, 2210, by the RSU, 990 which is an exemplary illustration for an image obfuscation method targeting layer 1 of the image file. Objects 2410A-B show the beginning format marker fields of a bitmapped image in the unmodified and modified data segment, respectively. This format marker field describes the structure of the image to include defining the file type as a bitmapped image, defining the size of the image, and a variety of image processing parameters. This area of the image is not modified, but is used for extracting parameters that are inputs to the obfuscation algorithm, 825E. Changes to the file can be observed by comparing objects 2420A-B thru 2440A-B in the original and modified versions of this first image datagram. FIG. 25 is a representation of a layer 2 binary modification using the same first datagram capture of image file, 2210. It is easily verified that the values depicted in objects 2520A-B through 2540A-B are layer 2 binary modifications in this representative sample.

Figure 27:
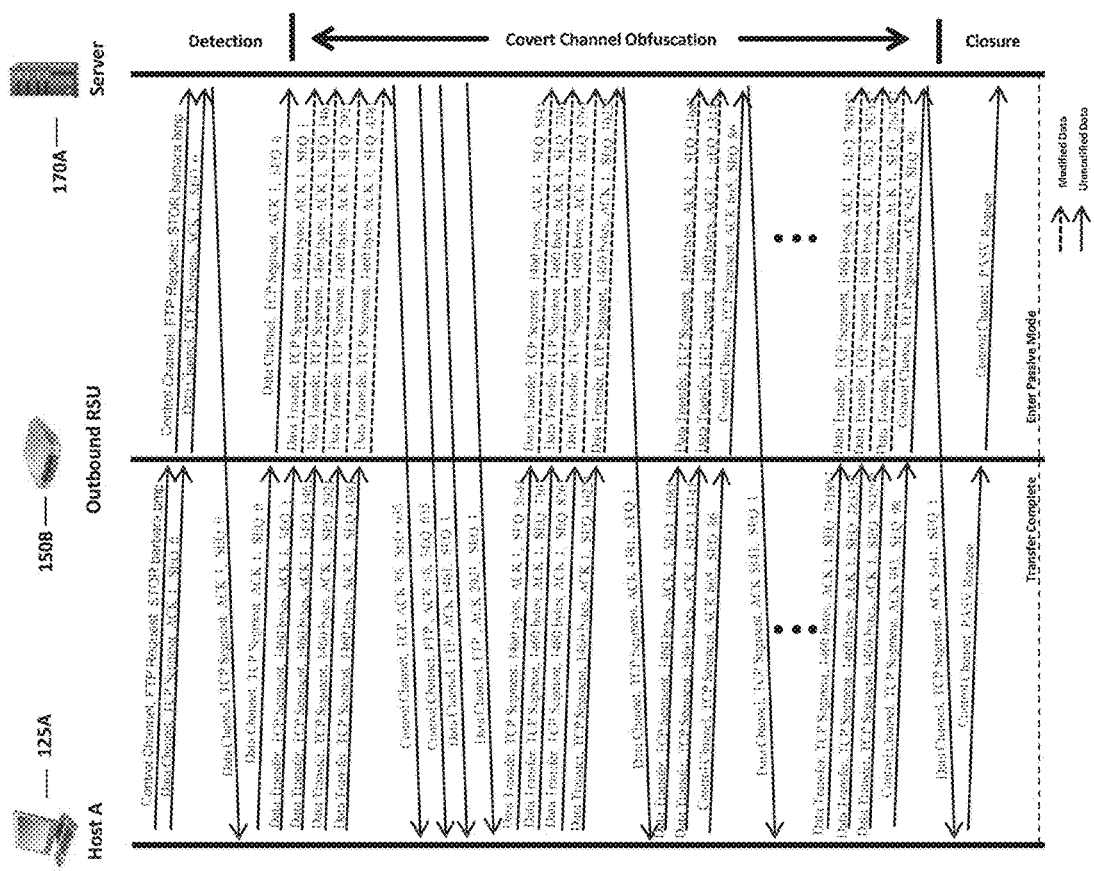
FIG. 27 is an illustration of a common network stream transaction flow for the outbound facing system of an embodiment of the present disclosure.
Figure 28:
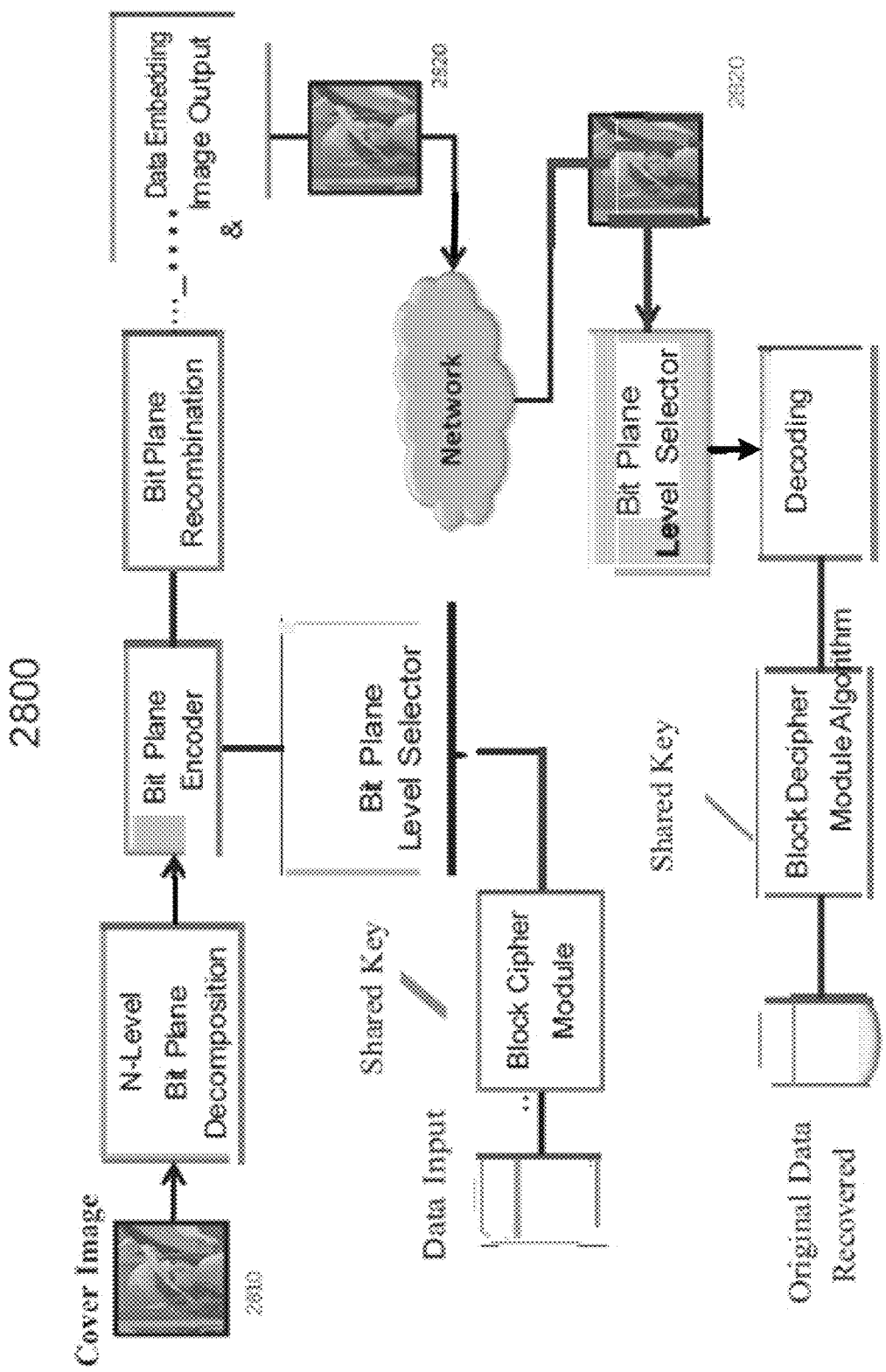
FIG. 28 shows a method used for embedding information into digital images, transferring the image over the Internet, and recovering the information by the receiving participant in the communications.

Referring back to FIG. 1, there is a sub-enclave, 105C, depicted as an outbound protected enclave with the overall defined system, 100. This sub-enclave, 105C is defined by those devices residing behind the outbound RSU, 150B, which is configured between the SDP router, 160A and the internal network switch, 155A. The placement and configuration of the RSU, 150B, is such that all outbound messages (datagrams) are intercepted, handled, inspected, have each of the individual data transfer stream states identified and maintained using a one sided channel flow of a normal two-channel stateful transmission, then these messages have selected modification algorithms applied, followed by a reconstruction the individual image datagrams and then forward these messages outward to the SDP, 160A, router and on to the intended recipient in real-time. FIG. 27 is a graphical depiction of the RSU, 150B, in this outbound message management configuration. The internal functionality of an outbound configured RSU is identical to the heretofore defined and described inbound configured RSU depictions shown throughout FIG. 1, FIG. 2, FIG. 3, and FIG. 4 as 150A and 250A. The process and functions are identical with respect to datagram or message operations vice the actual flow path of the data streams. In both configurations, as inbound or outbound facing devices, the various embodiments represent a unique functionality including capturing one communications channel, specifically transmit or receive, and on this unidirectional communications channel, intercept, handle, inspect, identify and maintain stream state of data flow using the one sided channel flow of a normal two-channel stateful transmission, then apply selected algorithmic modification processes on the message data, followed by a reconstruction the individual image datagrams and then forward these messages to the intended recipient in real-time. As was shown previously in FIG. 11, a complementary, high level process flow diagram that describes the datagram stream flow into, within, and out of the system when configured as an outbound data facing device is depicted in FIG. 28. Referring to FIG. 1, all message traffic originating from Users [1-4] and egressing the sub-enclave, defined by the placement of RSU 150B between the internal network switch, 155A and the SDP router, 160A, will be subjected to full processing functionality and effect of an embodiment which may include this current exemplary implementation.

There are a broad plurality of beneficial information assurance and general data protection applications available in using the various embodiments as a covert channel obfuscation processor on multimedia carrier files. In one embodiment, the disclosure is configured as an outbound protection device as shown in FIG. 1 in which the sub-enclave 105C was established by outbound RSU 150B. Sensitive or protected data that might have been covertly integrated into outbound multimedia files will be obfuscated.

Covert embedding of protected or sensitive data into these file types may be perpetrated by known maleficent actors or possibly by sophisticated malware operating unwittingly on an end users processing system. In another embodiment, the disclosure is configured as an inbound covert channel protection system, shown in FIG. 1 as RSU 150A, for the express purpose of disrupting and preventing the infiltration of malicious executables or possibly incriminating data (private or company sensitive) from being unknowingly delivered to end user systems. Recent information security reports suggest that the use of multimedia formatted files as carriers of spyware or malware is on the rise due to the inability of current IDS/IPS technologies to detect this type of advance evasion technique.

These limited examples of multimedia file obfuscation functionality of the disclosure are not to be considered restrictive or constrained in implementation in any way. The disruption or obfuscation of hidden data channels may be broadly used in a plurality of information security, information assurance, or information protection applications. Similar methods are equally and likewise conveyed for audio and video file obfuscation. The methods and results of this particular embodiment therefore demonstrate the ability of the disclosure to, on a unidirectional communications channel, intercept, handle, inspect, identify and maintain stream state of data flow using the one sided channel flow of a normal two-channel stateful transmission, then apply selected algorithmic modification processes on the message data, followed by a reconstruction the individual image datagrams and then forward these messages to the intended recipient in real-time.

A plurality of multimedia obfuscation methods may be employed which have imperceptible artifacts when subjected to the scrutiny of the human visual system (HVS) and human auditory system (HAS). As such, this exemplary implementation using the first and second layer binary modifications of a bitmapped image is merely illustrative and instructional for understanding the various embodiments. It is to be considered a matter of course that any specific obfuscation algorithm employed in the various embodiments may be categorized as either one-way or two-way functions. More directly, the obfuscation methods used by the disclosure and applied on the multimedia file by be of a class of algorithms that are either reversible or irreversible. As such, in one embodiment of this exemplary implementation, the obfuscated file may be completely reverted back to the original file as a bit-by-bit duplicate using a plurality of file restoration processes.

An additional embodiment of this file restoration process may include a plurality of specific programmed computer applications operating on the end user system with the proper reversing functions and sufficient security and trust assigned. This application, which may involve a plurality of authentication actions to recover the original image file structure and could effectively and efficiently restore any file type to its original state. In one embodiment of this reversing and file restoration process, the desired file restoration may be accomplished with no end user awareness or interaction. In the case of this unattended restoration, specialized feature vector analysis with formalized classification functions are envisioned to achieve this outcome.

Exemplary Implementation as an Autonomous Image Privacy Sanitizer.

In a direct follow-on relation to the aforementioned exemplary implementations which obfuscates covert channel data within multimedia carrier files, another embodiment of this disclosure is a stream based, real-time, autonomous digital image, audio, and video file sanitizer. In the same way that the previously described algorithms are used to identify file structure types and subsequently identify binary target values within a live steam transfer so as to obfuscate specific data elements in a given multimedia formatted file (e.g., audio, video, and image), one embodiment of the system demonstrates the functionality to sanitize multimedia files of identifiable data. Identifiable data is routinely embedded in multimedia files by vendors or manufacturers. This identifiable data consists of a wide variety of meta-data structures and various data artifacts that include for example, geo-location of digital file, the serial number of the camera, video, or sound recording device, time and data information, and even software versions and user traceable serial numbers. These data remnants and data structures are specifically marked and identified in the multimedia file stream using published standards. One exemplary implementation of the various embodiments uses the deep packet scanning and structure file identification capabilities of the system, previously described in detail, to autonomously obfuscate detected regions within multimedia file formats representative of these data remnant or meta-data structures. The specific means and methods by which this embodiment may be implemented is explicitly related and parallels with several previously described embodiments.

Exemplary Implementation to Cooperatively and Unperceptively Inject or Extract Covert Data into Multimedia Carrier Files using Real-time Interception of Targeted Streaming Data. In the aforementioned exemplary embodiments, the disclosure was described by detailing various means and methods for affecting individual data elements within a stream of stateful tracked datagrams flowing between two end node processes through an embodiment which, by its placement and configuration in the network, defined one or more protected enclaves. An exemplary implementation is now presented which describes the means and methods whereby the various embodiments use message interception and retransmission methods to cooperatively inject or extract covert data into a plurality of multimedia carrier files as this data is streaming and exchanged, real-time between two end processing nodes over a datagram based network. These covert channel operations on the streamed multimedia carrier file are imperceptible modifications to the end user nodes.

FIG. 28 depicts a model for a state-of-the art method of embedding and extracting covert data into a multimedia file. In this case the multimedia file is a standard image. This exemplary system depiction, 2800, is fully representative of a generalized steganography system that use audio, video or images as its multimedia carrier. For brevity, this system will be defined as the current exemplary implementation but should not be consider restrictive in any way to this specific construct. In FIG. 28, it is seen that the multimedia image cover file, 2810, is pre-processed by an embedding algorithm which embeds data into the cover file resulting in an output stego-image, 2820. This stego-image, 2820 is then transferred over a datagram based network, in the same manner and means previously described for file transfers over such networks, where it is reconstituted as the same stego-image by the recipient.

Figure 29:
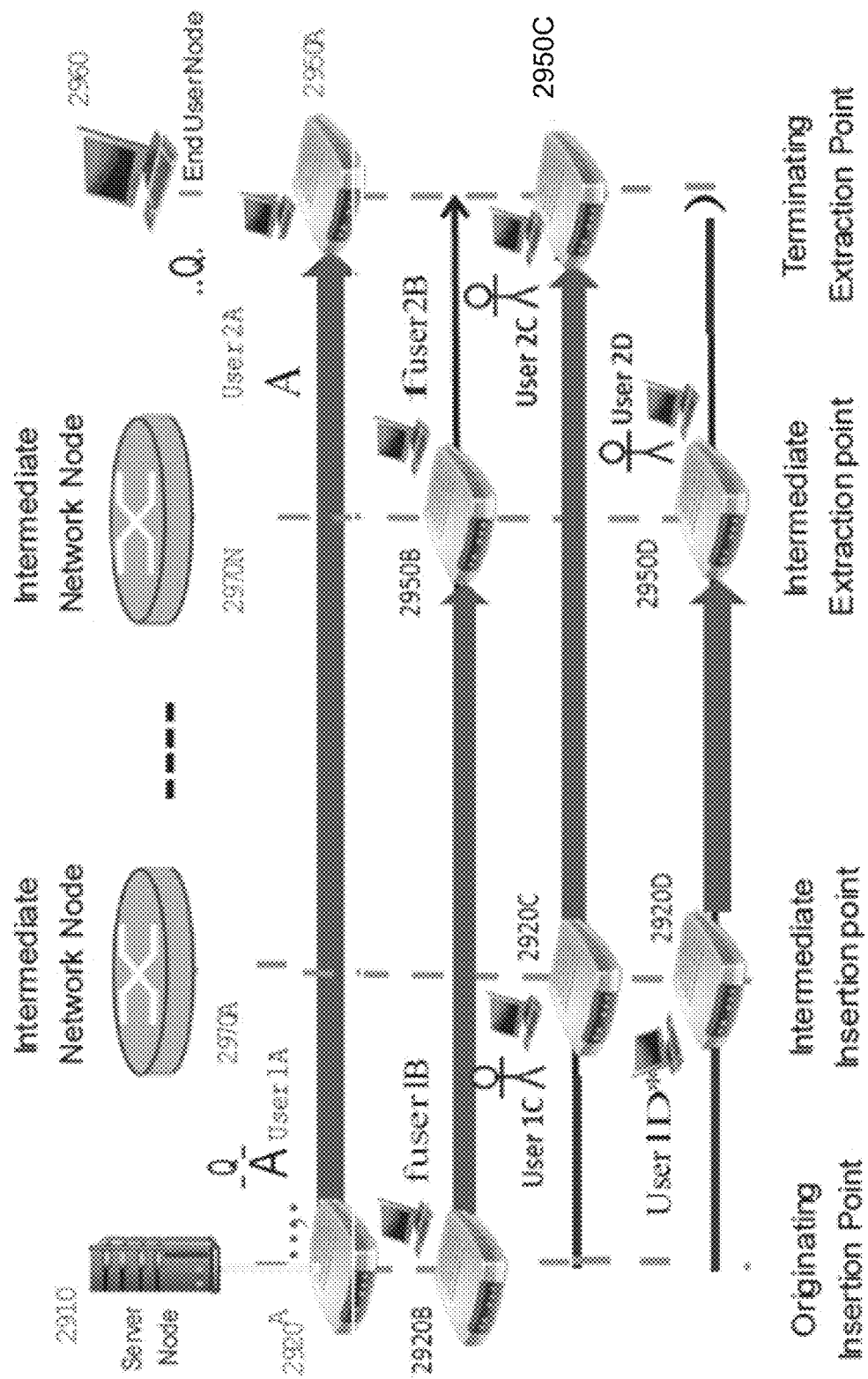
FIG. 29 is a system level diagram showing the RSU system implemented at various end-point and intermediate nodes.
Figure 30:
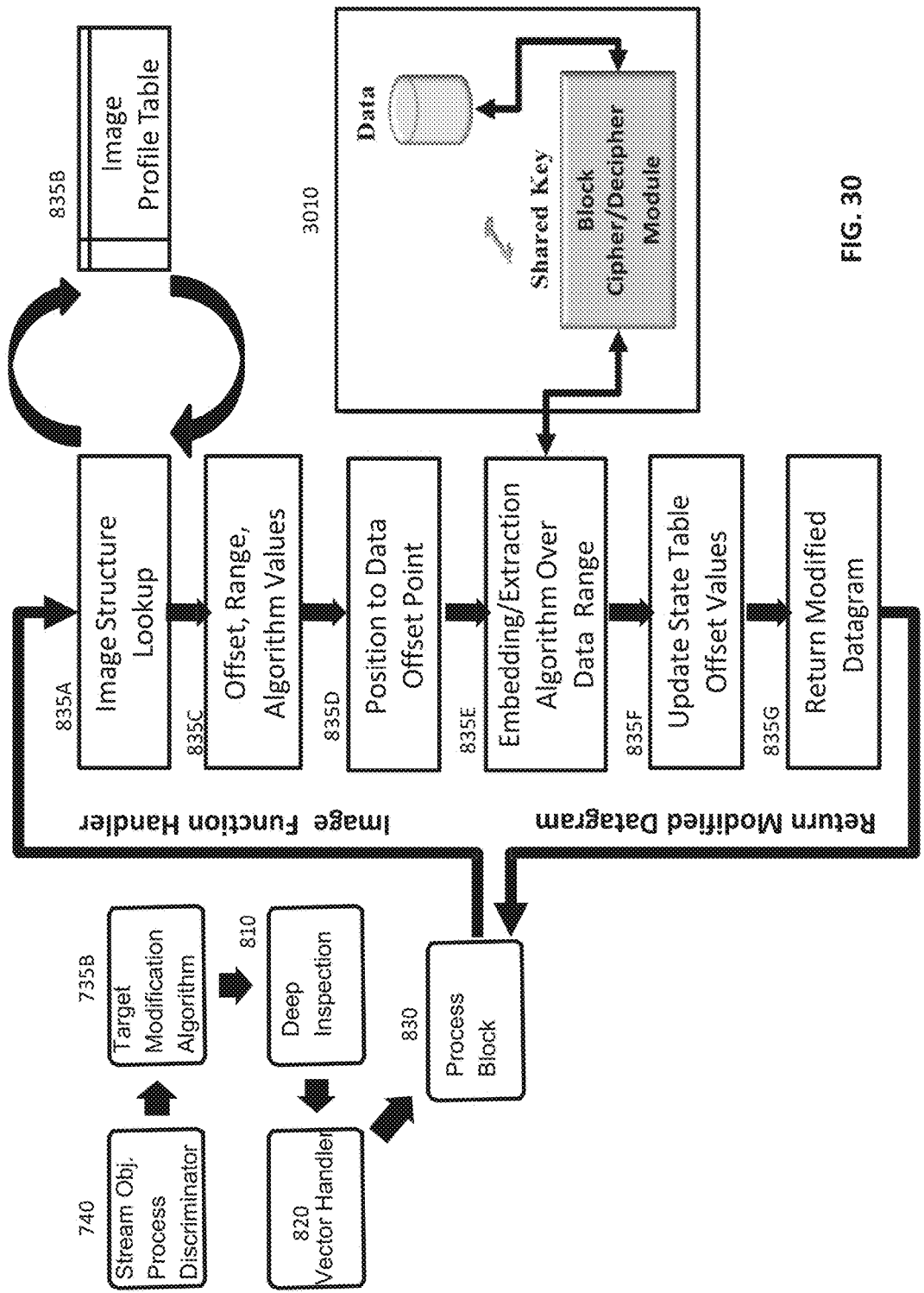
FIG. 30 shows a modification process which represents the process the RSU operator employs to inject or extract known data into the identified stream.

FIG. 29 is an exemplary system implementation diagram for embedding and extracting covert data in an extended network environment. A classic client-server paradigm scenario is considered where the server node, 2910, is transmitting a multimedia file over an extended network (e.g., Internet) to a distinct user node, 2960. This multimedia file may be an audio, video, or image file type. The detailed interactive message modification algorithms used by the RSU device are prescriptive with respect to the multimedia file type and the processes and functions related to how the messages are modified are described in detailed in the preceding disclosure descriptions. FIG. 29 shows four specific exemplary use cases where operator actors, User1 [A-D] and User2 [A-D] are controlling the RSU devices, 2920 [A-D] and 2950 [A-D] at various points along a network path to implement a cooperative covert channel data exchange capability. In each of these cases, User 1 is using the same fundamental techniques used to obfuscate selected multimedia data channels as was depicted and described in FIG. 21 to FIG. 27. A slight adaptation to the obfuscation algorithm on the RSU device may be implemented in order to substitute the obfuscation effect on the message with a stream of desired data with the intent to extract and recover this data. FIG. 30 shows a modification process 3010, which represents that process the RSU operator employs to inject or extract known data into the identified stream. This injection or extraction process is used rather than using simple obfuscation process as previously described.

Block 835E shows the algorithm used performs embedding and extraction instead of message obfuscation. User 1A, FIG. 29 in this instance will insert known data in those binary positions of the multimedia file that were previously identified as obfuscation targeted bits. User 2A, FIG. 29 will detect the stream file and using the same processes of interception and analysis, will extract the covert data from known, prearranged points in the data stream, effectively recovering the embedded message. These known data points can be obfuscated again by User 2[A-D] or left as is. In both cases, the final multimedia file that is delivered to end user node, 2960, will differ from the original file as transmitted from server node 2910. An embodiment in this use case scenario considers the methods used to identify selected or targeted data streams as they transverse through a given network node. It is an intended assumption that any specifically targeted stream will be provided or streamed directly to the RSU device for action. This can be performed using various network switching and routing methods to include hardware load balancers or stream redirection methods. Instances for this type of complementary stream detection functions are relevant to the scenarios of FIG. 29 for communications between 2920B to 2950B, 2920C to 2950C, and for 2920D to 2950D in which the intermediate RSU integration points on the network are used. A plurality of multimedia covert injection methods may be employed which have imperceptible artifacts when subjected to the scrutiny of the human visual system (HVS) and human auditory system (HAS). As such, any exemplary implementation, such as using the first and second layer binary modifications of a bitmapped image is illustrative and instructional but is not limiting of other methods of covert channel embedding.

Exemplary Implementation for Real-Time User Unique File Tagging of Digital Multimedia Data Files.

In a direct follow-on relation to the aforementioned exemplary implementation which embeds and extracts data within multimedia carrier files, another embodiment of this disclosure is a digital data embedding capability for digital file tagging. In the same way that algorithms are used to obfuscate specific data elements in a multimedia formatted file (e.g., audio, video, and image) an embodiment of the system demonstrates the functionality to embed session-unique digital tags within the real-time data flows of multimedia files. Session unique digital tags can be a specific user identifier (logon ID), the host IP address, network hardware address, epoch time, or even the unique CPU serial number can be used to establish verifiably unique digital data tags. The resultant data artifacts from this tagging function may be used to subsequently enforce privacy policies, intellectual property management, copyright protection, as well as digital content delivery management. The specific means and methods by which this embodiment may be implemented is explicitly related and parallels with the previously described embodiment.

Exemplary Implementation as a Personal Protected Email Communications System.

Electronic messaging, or email privacy continues to be a driving privacy rights advocacy issue in the world. The fact that the major email hosting services have unrestricted access to private communiques of most every world citizen is driving this debate. In this present embodiment of the disclosure, an exemplary implementation of a personal protected email communications system is described. It is contemplated that this disclosure may permit the end users, or the originator and the recipients of the message, to maintain control over the data content of electronic messages resulting is a more private communique to occur.

Figure 31:
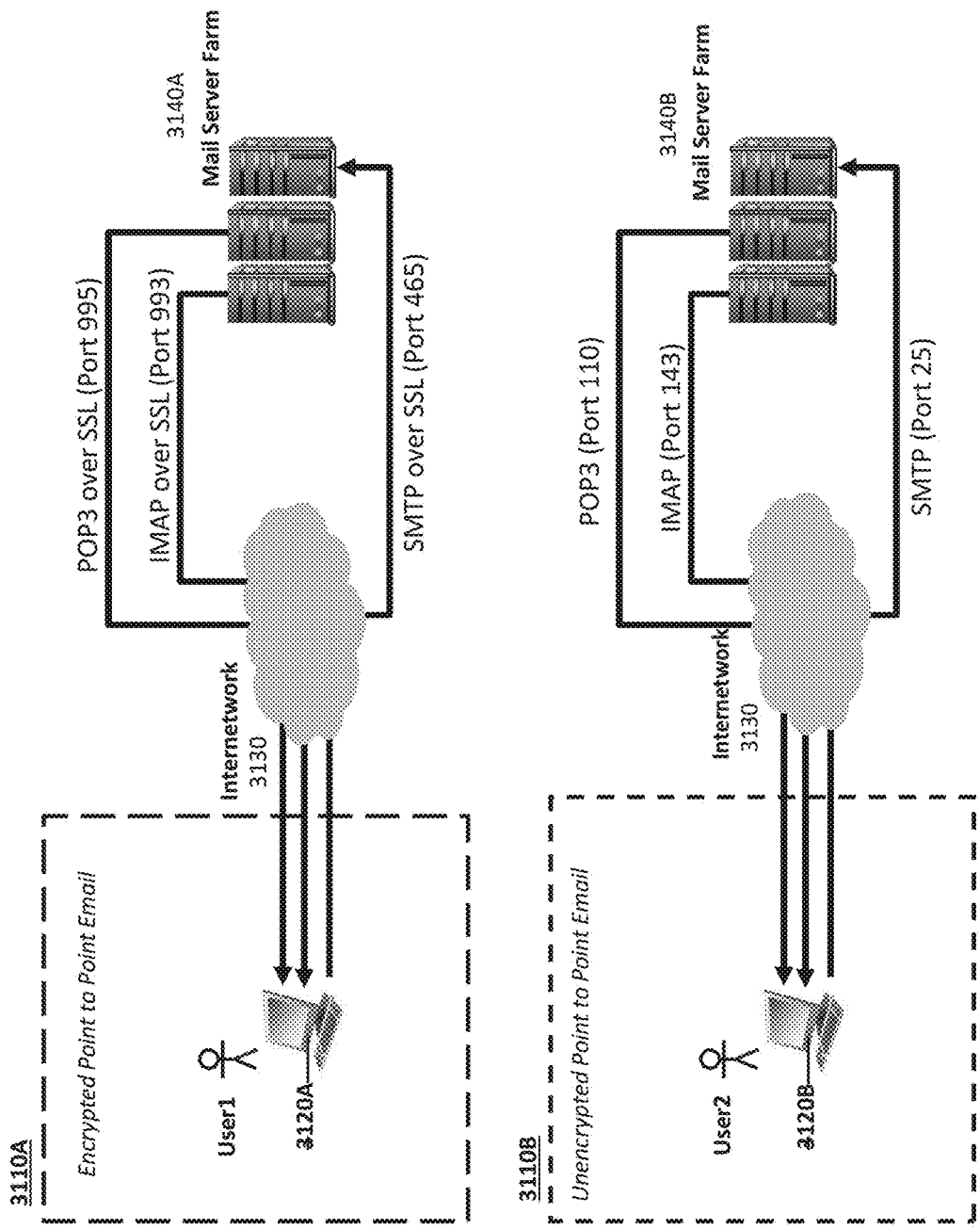
FIG. 31 shows the current methods for exchanging email from a user end node (e.g., a workstation) and an email hosting service such as GOOGLE's GMAIL service, MICROSOFT's OUTLOOK webmail, and YAHOO's YAHOO MAIL service.

FIG. 31 shows various methods for exchanging email from a user end node (workstation) and an email hosting service such as GOOGLE's GMAIL service, MICROSOFT's OUTLOOK webmail, and YAHOO's YAHOO MAIL service. The enclave, 3110A, in FIG. 31 shows the network port access configurations for User1 on terminal 3120A. A single user is depicted for brevity but should not be interpreted as a limitation of this exemplary implementation. The mail port options in this configuration include inbound email POP3 or IMAP services via 995 and 993 respectively and the outbound email service of SMTP over port 465. Each of these network port connections utilize encryption to secure the stateful connection between the end user terminal, 3120A, and the port servicing hosts on 3140A. All communications entering or leaving the terminal host is encrypted as it travels over the Internet. This email configuration can be categorized as an encrypted point-to-point electronic messaging system. FIG. 32 shows the packet capture session during a normal email transaction for the user to service configuration shown in FIG. 31, configuration block 3110A.

Figure 33:
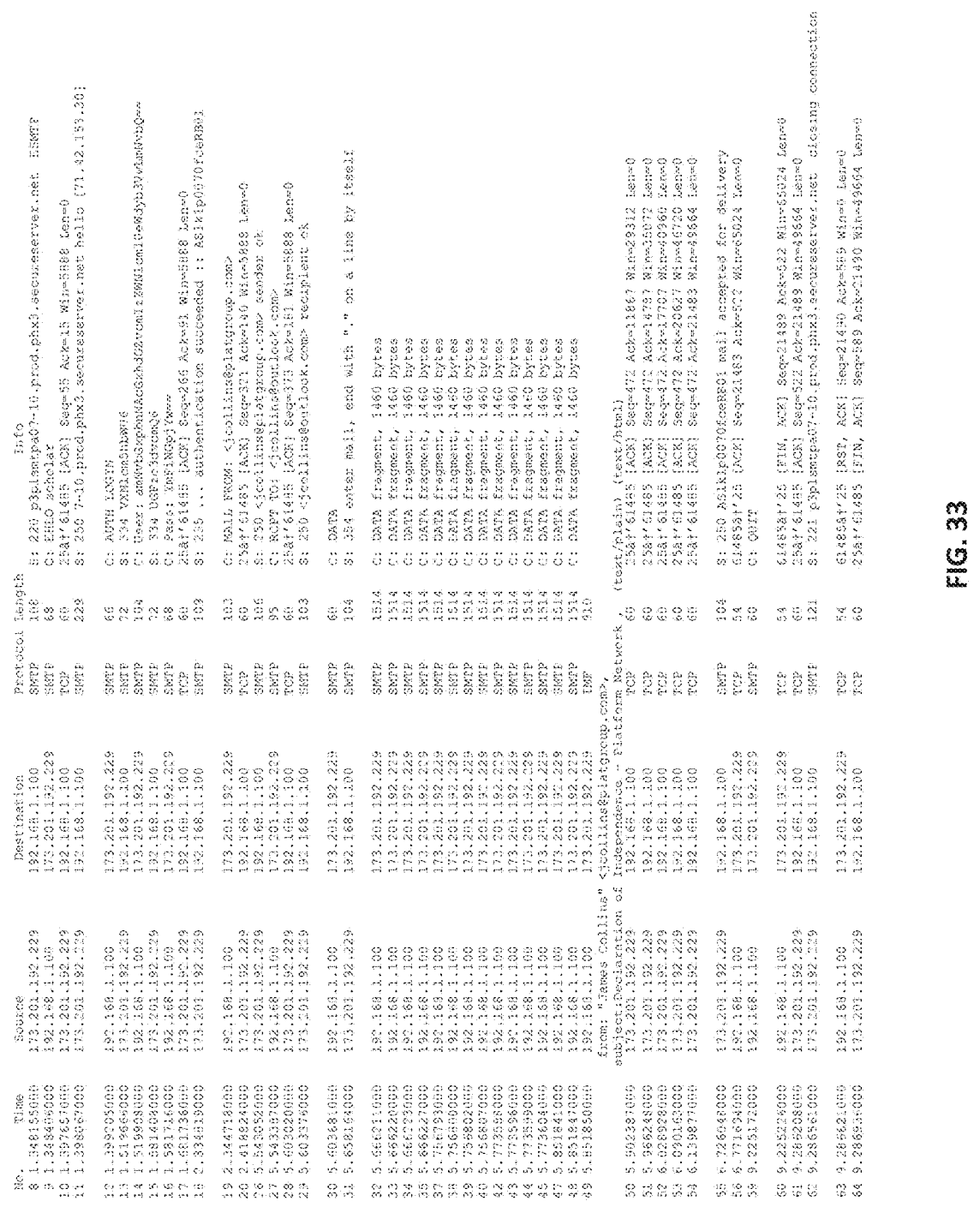

Also in FIG. 31, object 3110B shows the network port access configurations for User1 on terminal 3120B. For this configuration, the mail port options include inbound email POP3 or IMAP services via 110 and 143 respectively and the outbound email service of SMTP over port 25. Each of these network port connections utilize no encryption and as such, the information exchanges between the end user terminal, 3120B and the email service server farm, 3140B is completely in the clear. All communications entering or leaving the terminal host is unencrypted as it briefly travels over the Internet. This email configuration can be categorized as an unencrypted point-to-point electronic messaging system. FIG. 33 shows the packet capture session during a normal email transaction for the user to service configuration shown in FIG. 31, configuration block 3110B.

The notable condition and security state for both email configuration environments shown in FIG. 31 is that in both instances, the email messages are stored on the email server farm systems in an unencrypted, clear text state. This information remains protected from users not authorized to access individual accounts and email message exchanges that transfer between mail exchange servers to mail exchange servers is encrypted. The fact that the statically hosted messages from private citizen is readable and searchable by the hosting services is the central concern of email privacy advocates.

Figure 34:
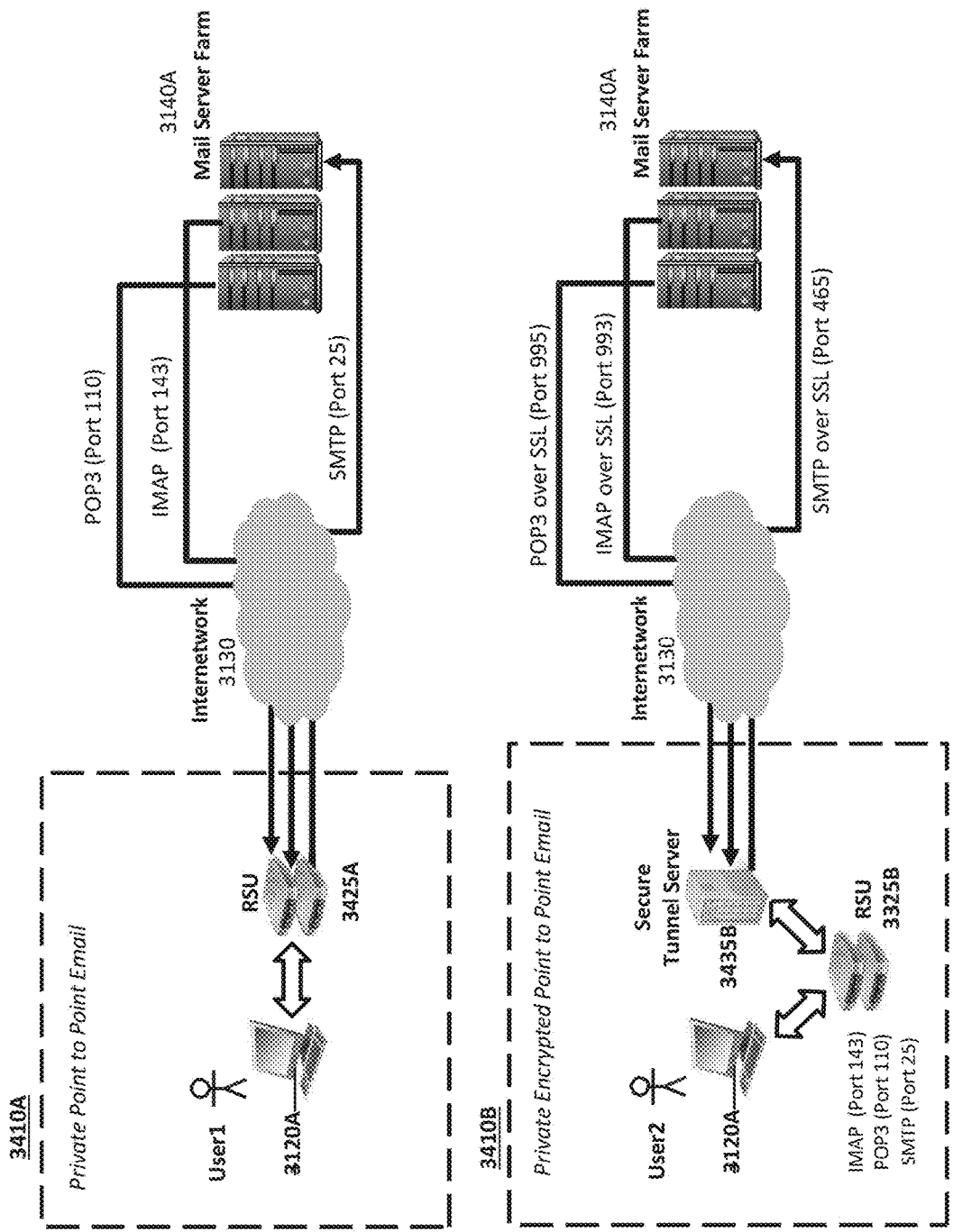
FIG. 34 represents an exemplary implementation of an embodiment which will establish secure email from the message originator to the final recipient, including during static storage on the email hosting service mail server farms.

FIG. 34 represents an exemplary implementation of an embodiment which will establish secure email from the message originator to the final recipient, including during static storage on the email hosting service mail server farms. System configuration block 3410A, in FIG. 34, depicts the network port access configurations for User1 on terminal 3120A. For this configuration, the mail port options include inbound email POP3 or IMAP services via 110 and 143 respectively and the outbound email service of SMTP over port 25. None of these service port connections utilize encryption and so all communications from the end user terminal, 3120A and the email service server farm, 3140A is normally expected to be completely in the clear. However, in this configuration, a pair of RSU devices, 3425A are configure in-line between the end user terminal and the Internet services, 3130, as outbound and inbound message interceptors and processors for message traffic coming from and destined to the mail server farm, 3140.

Referring back to FIG. 7, this figure depicts the processes involved in identifying specific stream object processes that will be used to modify any given message traffic. In this figure, the stream object process discriminator, 740, would be used to categorize email messages as a text based service, defined in block 735A.

Figure 35:
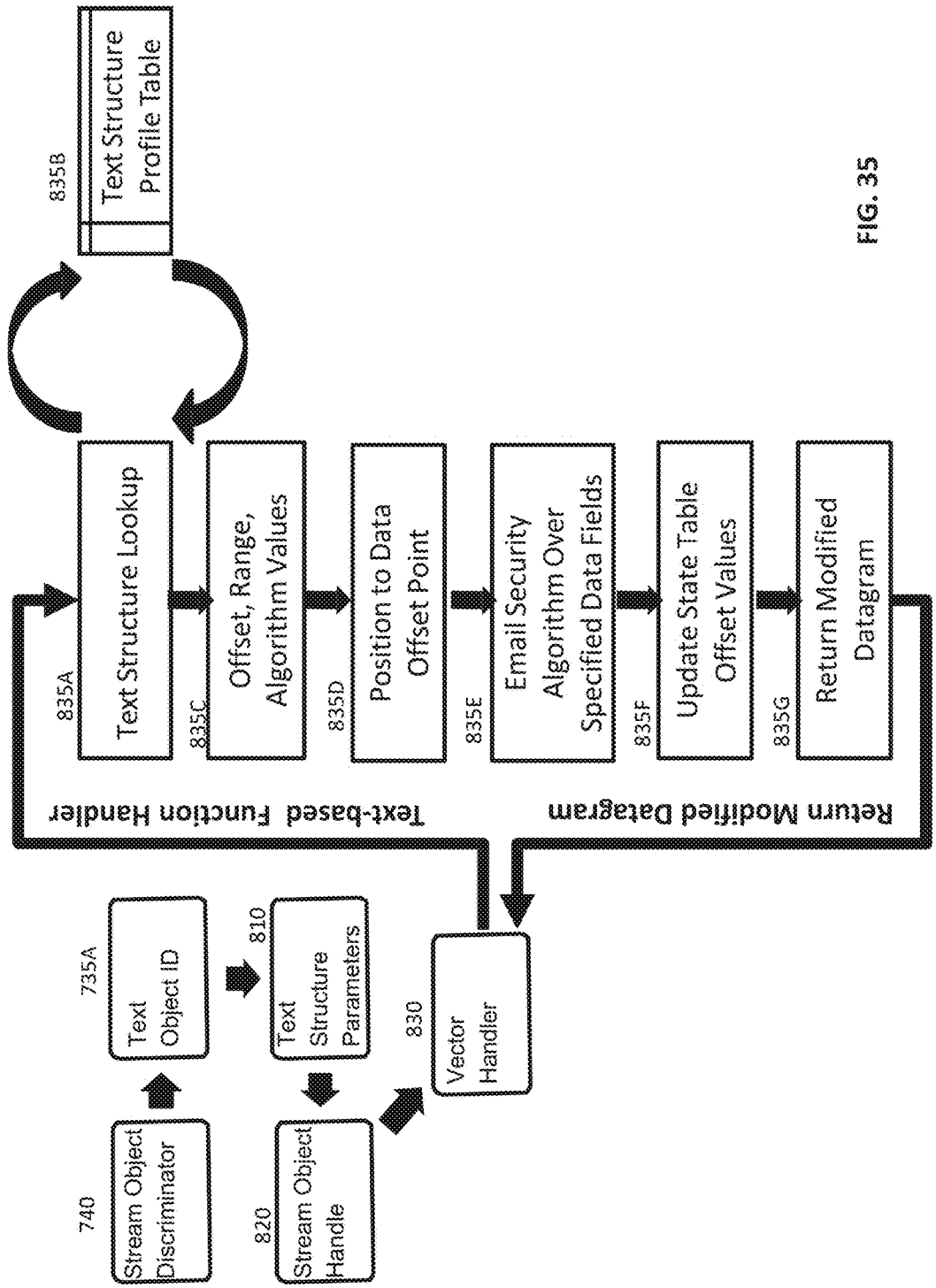
FIG. 35 depicts the process flow by which text based email is modified by both inbound and outbound configure RSU devices.

In very similar fashion to the methods used for the obfuscation of active executable files as depicted in FIG. 15 through FIG. 20 and described in the associated narrative, the same process flow is used for implementing private email message exchanges. FIG. 35 depicts the process flow by which text based email is modified by both inbound and outbound configure RSU devices. The email text data fields are identified during the deep packet inspection and this derived parametric data is submitted to the security algorithm in block 835E to ensure the proper fields are processed over the prescribed data length.

FIG. 33, block configuration 3310B shows a case in which a secure tunnel server, 3335B, is configured between the Internet connection and the RSU units, 3352B. In this configuration, the secure tunnel server acts as an intermediating device between the RSU units, 3325B, and the external Internet. The secure tunnel server provides a complete end-to-end encrypted communications path between the 3310B enclave and the mail server farms. Essentially this technology ensures that RSU maintains deep packet visibility of the message traffic while providing a private encrypted point-to-point electronics messaging environment.

In this illustrative embodiment we can observe that both of the email configuration environments shown in FIG. 34, are protected with the disclosure. Also notable is the email messages transmitted under these condition are stored on the email server farm systems in a secure state, as implemented by the internal encoding or encryption algorithms of the intermediating RSU devices. This information remains equally protected from unauthorized users and from the administrators of the email service providers. These statically hosted messages will remain routable in the mail exchange system and will be readable by the intended recipients or message originators.

The disclosed system and method of use is generally described, with examples incorporated as particular embodiments of the disclosure and to demonstrate the practice and advantages thereof. It is understood that the examples are given by way of illustration and are not intended to limit the specification or the claims in any manner.

To facilitate the understanding of this disclosure, a number of terms may be defined in this application. Terms such as "a", "an", and "the" are not intended to refer to only a singular entity, but include the general class of which a specific example may be used for illustration. The terminology herein is used to describe specific embodiments of the disclosure, but their usage does not delimit the disclosed device or method, except as may be outlined in the claims.

It will be understood that particular embodiments described herein are shown by way of illustration and not as limitations of the disclosure. The principal features of this disclosure can be employed in various embodiments without departing from the scope of the disclosure. Such equivalents are considered to be within the scope of this disclosure and are covered by the claims.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, are be construed closed or semi-closed transitional phrases.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a nonvolatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a computer system at a respective participant location may include a memory medium(s) on which one or more computer programs or software components according to one embodiment may be stored. For example, the memory medium may store one or more programs that are executable to perform the methods described herein. The memory medium may also store operating system software, as well as other software for operation of the computer system.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using MICROSOFT ActiveX controls, C++ objects, JavaBeans, MICROSOFT Foundation Classes (MFC), browser-based applications (e.g., JAVA applets), traditional programs, or other technologies or methodologies. A CPU executing code and data from the memory medium may include a means for creating and executing the software program or programs according to the embodiments described herein. It is to be understood that the forms of the disclosure shown and described herein are to be taken as examples of embodiments. Elements and materials may be substituted for those illustrated and described herein, parts and processes may be reversed, and certain features of the disclosure may be utilized independently. Changes may be made in the elements described herein without departing from the spirit and scope of the disclosure as described in the following claims.

What is claimed is:

1. A method, comprising:
   identifying a plurality of per-session stream network protocol identifiers for an intercepted message segment;
   identifying a plurality of per-session stream application-level data descriptors for the intercepted message segment;
   identifying a byte-offset position corresponding to an initial byte position of a stream application associated with the intercepted message segment;
   identifying a bit position referenced by the initial byte position of the stream application;
   determine that the intercepted message segment is included in a state table;
   determine that the intercepted message segment requires modification from the state table;
   modify the message segment based at least in part on the bit position referenced by the initial byte position and the byte-offset position; and
   forwarding the modified message.

2. The method of claim 1, further comprising tracking at least one of: a plurality of individually identifiable stream states for the intercepted message traffic, a plurality of individually identifiable network protocols, a plurality of individually identifiable byte-streams, or a plurality of individually identifiable bit positions.

3. The method of claim 1, wherein at least one of the plurality of per-session stream network protocol identifiers or the plurality of per-session stream application-level data descriptors are identified based at least in part on a unidirectional message data flow.

4. The method of claim 1, at least one of the byte-offset position or the bit position is identified based at least in part on a unidirectional message data flow.

5. The method of claim 1, wherein at least one of the following is maintained across multiple packet segments that may be of out of packet sequence order:
   the plurality of per-session stream network protocol identifiers;
   the plurality of per-session stream application-level data descriptors;
   the byte-offset position; or
   the bit position.

6. A method, comprising:
   identifying a plurality of individualized data transport stream session identifiers from intercepted message traffic, the intercepted message traffic comprising a plurality of message segments and a plurality of message streams;
   identifying a plurality of per-session stream network protocol identifiers for each message segment;
   identifying a plurality of per-session stream application-level data descriptors for each message segment;
   identifying a byte-offset position, as referenced by an initial byte position, for each individual message segment;
   identifying a specific bit position, as referenced by the initial byte position, in the plurality of message streams for each of the plurality of message segments;
   determine that at least one of the plurality of message segments in at least one of the plurality of message streams is included in a state table;
   determine that the at least one of the plurality of message segments in the at least one of the plurality of message streams requires modification based at least in part on inclusion in the state table;
   modify the at the at least one of the plurality of message segments in the at least one of the plurality of message streams; and
   forward the at the at least one of the plurality of message segments in the at least one of the plurality of message streams.

7. The method of claim 6, further comprising tracking at least one of:
   a plurality of individually identifiable stream states for individual ones of the plurality of message streams;
   a plurality of individually identifiable network protocols for individual ones of the plurality of message streams;
   a plurality of individually identifiable byte-streams for individual ones of the plurality of message streams; or
   a plurality of individually identifiable bit positions for individual ones of the plurality of message streams.

8. The method of claim 6, wherein at least one of following is identified based at least in part on a unidirectional message data flow:

individual ones of the plurality of messages streams;
the byte-offset position; or
the specific bit position.

9. The method of claim 6, further comprising maintaining across multiple packet segments at least one of the following:
individually identifiable stream states for the plurality of message streams;
the byte-offset position across multiple packet segments; or
the specific bit position across multiple packet segments.

10. The method of claim 6, wherein response messages are excluded from the intercepted message traffic.

11. The method of claim 6, further comprising:
selectively modifying a plurality of bit values within an intercepted message based at least in part on a stream state, at least one of a plurality of protocol identifiers, at least one of a plurality of application identifiers, the byte offset position, and the bit offset position; and
storing the plurality of bit values within an inbound message stream state memory vector.

12. The method of claim 11, further comprising modifying the intercepted message based at least in part on a value of the at least one of the plurality of application identifiers.

13. The method of claim 11, further comprising updating the plurality of bit values within in the inbound message stream state memory vector.

14. The method of claim 11, further comprising selectively flushing the inbound message stream state memory vector in response to termination of a distinct stream state.

15. The method of claim 11, wherein the intercepted message is modified with a stream vector handler function and the method further comprises retransmitting the intercepted message to an intended recipient as a valid modified message.

16. The method of claim 6, further comprising:
selectively modifying a plurality of bit values within an intercepted message based at least in part on a stream state, at least one of a plurality of protocol identifiers, at least one of a plurality of application identifiers, the byte offset position, and the bit offset position; and
storing the plurality of bit values within an outbound message stream state memory vector.

17. The method of claim 16, further comprising updating the plurality of bit values within the outbound message stream state memory vector.

18. The method of claim 16, further comprising selectively flushing the outbound message stream state memory vector in response to termination of a distinct stream state.

19. A system, comprising
a computing device comprising at least one or more processors and a memory; and
machine readable instructions stored in the memory that, when executed by the processor, cause the processor to at least:
capture a message;
decompose a message to identify a network protocol structure, a transport protocol structure, an application protocol structure, and a plurality of application data object identifiers;
assign the message to an internal memory state vector identifier;
process the message with an internal stream vector handler function;
analyze a message decomposition identifier to determine if the message exists in a state table;
analyze the message in response to a determination that the message is included in the state table;
analyze the message decomposition identifier to determine if a message object requires modification;
release the message to a stream vector handler in response to a determination that message does not require modification;
forward the message object to a stream object processor in response to a determination that the message object requires identification;
modify objects within a stateful data stream at a discrete bit level;
return messages with modified stream objects to the stream vector handler;
reconstitute the modified message; and
forward the modified message.

20. The system of claim 19, wherein the system further comprises a communication port for integration with an out-bound only network system, wherein the communication port facilitates an exchange of stream state data for intercepting a session secured with a version of the secure sockets layer (SSL) protocol or a version of the transport layer security (TLS) protocol.

* * * * *